US012784503B2

(12) United States Patent
Cho

(10) Patent No.: US 12,784,503 B2
(45) Date of Patent: Nov. 3, 2026

(54) ELECTRONIC DEVICE AND METHOD FOR TRACKING MOTION OF USER

(71) Applicant: SAMSUNG ELECTRONICS CO., LTD., Suwon-si (KR)

(72) Inventor: Sehyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/064,264

(22) Filed: Feb. 26, 2025

(65) Prior Publication Data

US 2025/0201024 A1 Jun. 19, 2025

Related U.S. Application Data

(63) Continuation of application No. PCT/KR2023/010616, filed on Jul. 21, 2023.

(30) Foreign Application Priority Data

Aug. 26, 2022 (KR) ........................ 10-2022-0107367
Sep. 26, 2022 (KR) ........................ 10-2022-0121999

(51) Int. Cl.
*G06V 40/20* (2022.01)
*G01C 21/16* (2006.01)
(Continued)

(52) U.S. Cl.
CPC ............. *G06V 40/20* (2022.01); *G01C 21/16* (2013.01); *G06F 3/011* (2013.01); *G06F 3/017* (2013.01); *H04N 23/73* (2023.01); *H04N 23/74* (2023.01)

(58) Field of Classification Search
CPC ...... A63F 13/211; A63F 13/212; A63F 13/24; G01C 21/16; G01P 7/00; G02B 27/0172;
(Continued)

(56) References Cited

U.S. PATENT DOCUMENTS 9,495,801 B2 11/2016 Ebstyne et al.
10,156,908 B2 12/2018 Stafford et al.
(Continued)

FOREIGN PATENT DOCUMENTS

CN 112214106 A 1/2021
EP 3796131 A1 3/2021
(Continued)

OTHER PUBLICATIONS

International Search Report and Written Opinion (PCT/ISA/210 and PCT/ISA/237) dated Nov. 8, 2023, issued by International Searching Authority for International Application No. PCT/KR2023/010616.

(Continued)

*Primary Examiner* — Mihir K Rayan
(74) *Attorney, Agent, or Firm* — Sughrue Mion, PLLC

(57) ABSTRACT

An electronic device includes: a camera; one communication circuitry to communicate with an external electronic device; and one processor configured to: obtain an image for the external electronic device, based on a first camera setting; receive, from the external electronic device, speed information of the external electronic device; and change the first camera setting to a second camera setting, based on the received speed information; wherein the first camera setting comprises a first frame length, wherein the second camera setting comprises a second frame length, wherein, in a first case that the speed information is greater than or equal to a threshold value, the second frame length is shorter than the first frame length, and wherein, in a second case that the speed information is smaller than the threshold value, the second frame length is longer than the first frame length.

20 Claims, 12 Drawing Sheets

(51) Int. Cl.
*G06F 3/01* (2006.01)
*H04N 23/73* (2023.01)
*H04N 23/74* (2023.01)

(58) Field of Classification Search
CPC .... G02B 2027/0138; G02B 2027/0187; G06F 3/011; G06F 3/012; G06F 3/013; G06F 3/016; G06F 3/017; G06F 3/0346; G06V 40/20; G06V 40/28; H04N 23/60; H04N 23/73; H04N 23/74
See application file for complete search history.

(56) References Cited

U.S. PATENT DOCUMENTS

| | | | | |
|---|---|---|---|---|
| 10,279,256 | B2 | 5/2019 | Baba | |
| 10,990,186 | B2 | 4/2021 | Wan et al. | |
| 11,842,432 | B2 | 12/2023 | Yokokawa | |
| 11,915,670 | B2 | 2/2024 | Griswold et al. | |
| 12,099,693 | B2 | 9/2024 | Ravasz et al. | |
| 2015/0015774 | A1* | 1/2015 | Sugie | H04N 23/73 348/364 |
| 2016/0094770 | A1* | 3/2016 | Chen | H04N 23/6811 348/229.1 |
| 2016/0288236 | A1* | 10/2016 | Becker | B23K 9/0956 |
| 2017/0336637 | A1* | 11/2017 | Van Heugten | G02B 7/04 |
| 2018/0364048 | A1* | 12/2018 | Cook | G06F 3/0346 |
| 2020/0351439 | A1 | 11/2020 | Yan et al. | |
| 2021/0239983 | A1 | 8/2021 | Song et al. | |
| 2021/0400185 | A1* | 12/2021 | Price | G02B 27/0093 |
| 2022/0050533 | A1 | 2/2022 | Woods | |
| 2022/0182778 | A1 | 6/2022 | Arya et al. | |
| 2022/0358663 | A1 | 11/2022 | Wu | |
| 2022/0382365 | A1 | 12/2022 | Zhang et al. | |
| 2023/0004214 | A1 | 1/2023 | Shcherbina et al. | |
| 2023/0106457 | A1* | 4/2023 | Jo | G06T 7/50 345/156 |
| 2024/0353680 | A1 | 10/2024 | Browy et al. | |

FOREIGN PATENT DOCUMENTS

| | | | | |
|---|---|---|---|---|
| JP | 2012-252581 | A | 12/2012 | |
| JP | 2015-169814 | A | 9/2015 | |
| JP | 2019211864 | A * | 12/2019 | G06T 19/00 |
| JP | 6798010 | B2 | 12/2020 | |
| JP | 2022-24100 | A | 2/2022 | |
| KR | 10-2011-0044391 | A | 4/2011 | |
| KR | 10-2019-0088545 | A | 7/2019 | |
| KR | 10-2019-0113724 | A | 10/2019 | |
| KR | 10 2021 0157708 | A | 12/2021 | |
| KR | 10-2022-0016273 | A | 2/2022 | |
| KR | 10-2022-0096115 | A | 7/2022 | |
| KR | 10-2023-0015800 | A | 1/2023 | |
| KR | 10-2667889 | B1 | 5/2024 | |
| WO | 2022 057579 | A1 | 3/2022 | |

OTHER PUBLICATIONS

Communication dated Oct. 13, 2025 issued by the European Patent Office in European Patent Application No. 23857582.3.
Communication dated Aug. 12, 2026 issued by the Korean Ministry of Intellectual Property in Korean Patent Application No. 10-2022-0121999.

* cited by examiner

ELECTRONIC DEVICE AND METHOD FOR TRACKING MOTION OF USER

CROSS-REFERENCE TO RELATED APPLICATIONS

This application is a by-pass continuation application of International Application No. PCT/KR2023/010616, filed on Jul. 21, 2023, which is based on and claims priority to Korean Patent Application Nos. 10-2022-0107367, filed on Aug. 26, 2022, and 10-2022-0121999, filed on Sep. 26, 2022, in the Korean Intellectual Property Office, the disclosures of which are incorporated by reference herein their entireties.

BACKGROUND

1. Field

The disclosure relates to an electronic device and a method for tracking a movement of a user.

2. Description of Related Art

A movement of a user may be tracked for an interaction between reality and virtual world in virtual reality (VR), augmented reality (AR), and/or mixed reality (MR). The tracked movement of the user may be inputted to a processor and reflected in a graphic. The user movement tracking may be performed through a controller. The controller may enable the processor to track the movement of the user. The controller may be an electronic device that provides haptic feedback to the user.

The above-described information may be provided as related art for the purpose of helping to understand the present disclosure. No claim or determination is raised as to whether any of the above-described information may be applied as prior art related to the present disclosure.

SUMMARY

According to an aspect of the disclosure, an electronic device includes: at least one camera; at least one communication circuitry configured to communicate with an external electronic device; and at least one processor operatively connected with the at least one camera and the at least one communication circuitry, wherein the at least one processor is configured to: obtain an image for the external electronic device, based on a first camera setting; receive, from the external electronic device, speed information of the external electronic device; and change the first camera setting to a second camera setting, based on the received speed information; wherein the first camera setting comprises a first frame length, wherein the second camera setting comprises a second frame length, wherein, in a first case that the speed information is greater than or equal to a threshold value, the second frame length is shorter than the first frame length, and wherein, in a second case that the speed information is smaller than the threshold value, the second frame length is longer than the first frame length.

In the first case that the speed information is greater than or equal to the threshold value, a second exposure value received during the second frame length may be smaller than a first exposure value received during the first frame length, and in the second case that the speed information is smaller than the threshold value, the second exposure value received during the second frame length may be greater than the first exposure value received during the first frame length.

The at least one processor may be further configured to: in a third case that the speed information is greater than or equal to a reference value, generate a control signal for increasing brightness of light emitted from the external electronic device, and transmit the control signal to the external electronic device.

The electronic device may be a head-mounted display (HMD) device including: a display; an optical waveguide for changing a path of light generated by the display; and a transparent member, and wherein the light generated by the display is transmitted through the transparent member.

The at least one processor may be further configured to: identify, from at least one image obtained based on the second camera setting, a portion corresponding to an object for tracking within the external electronic device, and perform a designated function based on a tracking result of the portion corresponding to the object.

The designated function may be recognition of a movement of a user.

The light emitted from the external electronic device may have a wavelength in an infrared band.

According to an aspect of the disclosure, a method performed by an electronic device, includes: obtaining a first image of an external electronic device based on a first camera setting; receiving, from the external electronic device, speed information of the external electronic device; changing the first camera setting to a second camera setting based on the received speed information; and obtaining at least a second image of the external electronic device based on the second camera setting, wherein the first camera setting comprises a first frame length, wherein the second camera setting comprises a second frame length, wherein, in a first case that the speed information is greater than or equal to a threshold value, the second frame length is shorter than the first frame length, and wherein, in a second case that the speed information is smaller than the threshold value, the second frame length is longer than the first frame length.

In the first case that the speed information is greater than or equal to the threshold value, a second exposure value received during the second frame length may be smaller than a first exposure value received during the first frame length. In the second case that the speed information is smaller than the threshold value, the second exposure value received during the second frame length may be greater than the first exposure value received during the first frame length.

The method may further include: in a third case that the speed information is greater than or equal to a reference value, generating a control signal for increasing brightness of light emitted from the external electronic device, and transmitting the control signal to the external electronic device.

The electronic device may include a head-mounted display (HMD) device including: a display; an optical waveguide for changing a path of light generated by the display; at least one camera; and a transparent member, and wherein light generated by the display is transmitted through the transparent member.

According to an aspect of the disclosure, an electronic device includes: an inertial measurement unit (IMU) sensor; at least one light source; at least one communication circuitry configured to communicate with an external electronic device; and at least one processor operatively connected to the IMU sensor, the at least one light source, and the at least one communication circuitry, wherein the at least one processor is configured to: obtain speed information of the electronic device through the IMU sensor; generate a signal for informing the speed information of the electronic device measured by the IMU sensor; and transmit the signal to the external electronic device.

The IMU sensor may be configured to: measure acceleration information; and obtain the speed information of the electronic device by adding up the acceleration information that are accumulated.

The at least one processor may be further configured to in a case that the speed information of the electronic device measured by the IMU sensor is greater than or equal to a reference value, increase brightness of light emitted from the at least one light source.

The at least one processor may be further configured to: receive a control signal from the external electronic device; and adjust the brightness of light emitted from the at least one light source based on the received control signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
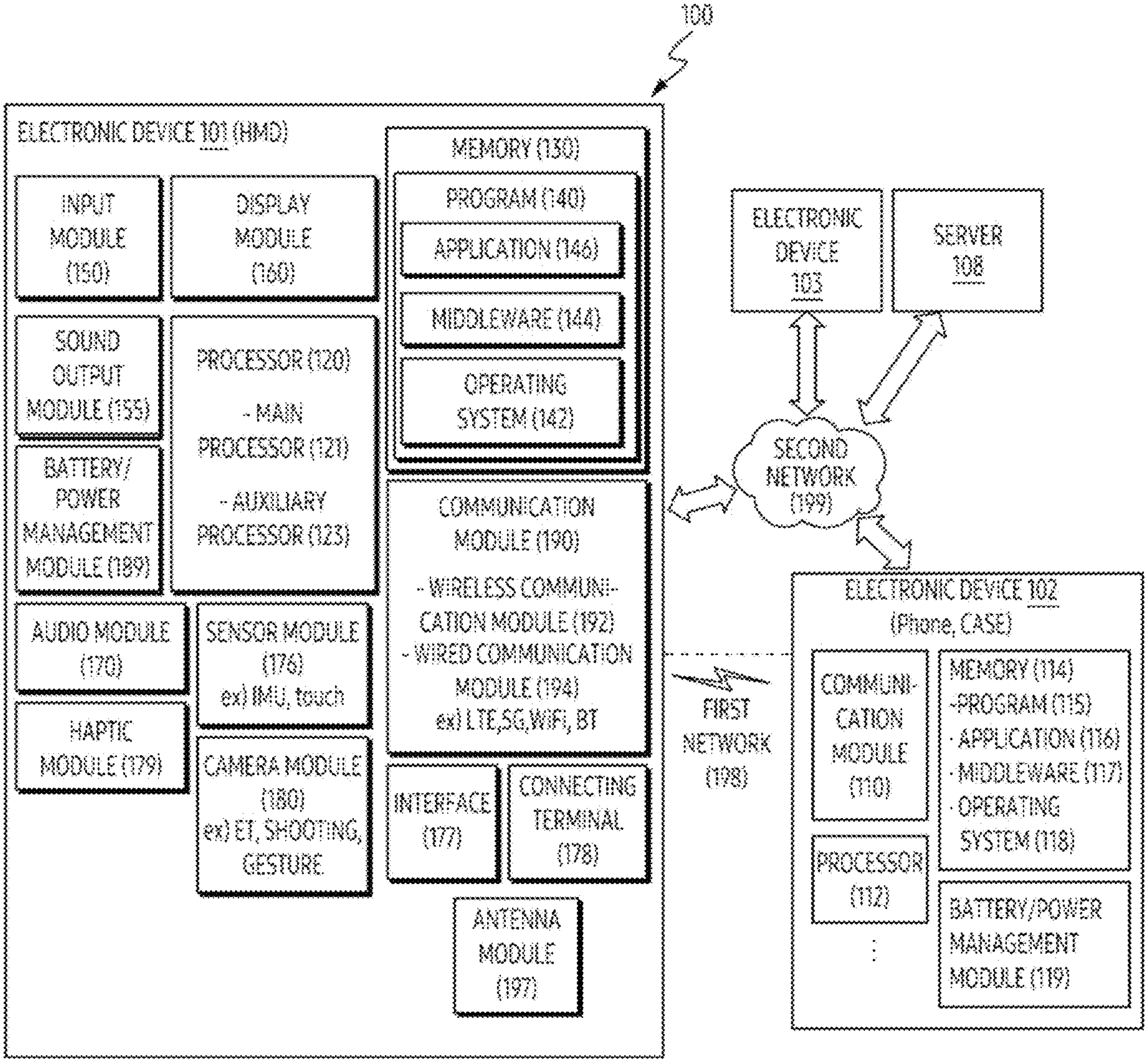
FIG. 1 illustrates an electronic device in a network environment according to one or more embodiments.

Terms used in the present disclosure are used only to describe a specific embodiment, and may not be intended to limit scope of another embodiment. A singular expression may include a plural expression unless the context clearly means otherwise. Terms used herein, including a technical or a scientific term, may have the same meaning as those generally understood by a person with ordinary skill in the art described in the present disclosure. Among the terms used in the present disclosure, terms defined in a general dictionary may be interpreted as identical or similar meaning to the contextual meaning of the relevant technology and are not interpreted as ideal or excessively formal meaning unless explicitly defined in the present disclosure. In some cases, even terms defined in the present disclosure may not be interpreted to exclude embodiments of the present disclosure.

In one or more embodiments of the present disclosure described below, a hardware approach will be described as an example. However, since one or more embodiments of the present disclosure include technology that uses both hardware and software, the one or more embodiments of the present disclosure do not exclude a software-based approach.

A term referring to a combination (e.g., merging and montaging), a term referring to a virtual image (e.g., an image of virtual reality and an image of augmented reality), a term referring to a controller (e.g., the controller, a user input device, and a user input electronic device), a term referring to a specified value (a reference value and a threshold value), and the like that are used in the following description are exemplified for convenience of explanation. Therefore, the present disclosure is not limited to terms described below, and other terms having equivalent technical meanings may be used. In addition, terms " . . . unit,' ' . . . device,' ' . . . object,' and ' . . . body', and the like' used below may mean at least one shape structure or a unit that processes a function.

In addition, in the present disclosure, a term 'greater than' or 'less than' may be used to determine whether a particular condition is satisfied or fulfilled, but this is only a description to express an example and does not exclude description of 'greater than or equal to' or 'less than or equal to'. A condition described as 'greater than or equal to' may be replaced with 'greater than', a condition described as 'less than or equal to' may be replaced with 'less than', and a condition described as 'greater than or equal to and less than' may be replaced with 'greater than and less than or equal to'. In addition, hereinafter, 'A' to 'B' means at least one of elements from A (including A) to B (including B). Hereinafter, 'C' and/or 'D' means that at least one of 'C' or 'D', that is, {'C', 'D', 'C' and 'D'}.

Prior to describing embodiments of the present disclosure, the terms necessary to describe operations of an electronic device according to embodiments are defined.

An electronic device for providing a virtual image may be a device that displays images such as virtual reality (VR), augmented reality (AR), and mixed reality (MR). For example, the electronic device for providing the virtual image may be a head-mounted display (HMD). For example, the electronic device for providing the virtual image may be an AR glasses.

A user input device may be an electronic device including a light source for tracking a movement of a user. For example, the user input device may be a controller.

FIG. 1 illustrates an electronic device 101 in a network environment 100 according to one or more embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., via a wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., via a wire) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, an electronic device 102 may communicate with an electronic device 101 through a first network 198 (e.g., a short-range wireless communication network).

According to an embodiment, a communication module 110 may support establishing a direct (e.g., wired) communication channel or a wireless communication channel between the electronic device 102 and an external electronic device (e.g., the electronic device 101) and performing communication via the established communication channel. The communication module 110 may include one or more communication processors that are operated independently from a processor 112 (e.g., an application processor) and support direct (e.g., wired) communication or wireless communication. According to an embodiment, the communication module 110 may include a wireless communication module (e.g., a cellular communication module, a short-range wireless communication module, or a GNSS communication module) or a wired communication module (e.g., a LAN communication module or a power line communication module). Among these communication modules, a corresponding communication module may communicate with the external electronic device 101 via the first network 198 (e.g., a short-range communication network, such as Bluetooth™, WiFi direct, or IrDA). These various types of communication modules may be implemented as a single component (e.g., a single chip), or may be implemented as a plurality of components (e.g., a plurality of chips) separate from each other. The wireless communication module may identify or authenticate the electronic device 102 in a communication network, such as the first network 198, using subscriber information (e.g., IMSI) stored in the subscriber identification module.

According to an embodiment, the processor 112 may execute, for example, software (e.g., a program 115) to control at least one other component (e.g., a hardware or software component) of the electronic device 102 connected to the processor 112, and may perform various data processing or a computation. According to an embodiment, as at least a portion of the data processing or the computation, the processor 112 may store a command or data received from another component (e.g., the communication module 110) in volatile memory, process the command or the data stored in the volatile memory, and store resulting data in non-volatile memory. According to an embodiment, the processor 112 may include a main processor (e.g., a central processing unit or an application processor), or an auxiliary processor (e.g., a graphics processing unit, a NPU, an image signal processor, a sensor hub processor, or a communication processor) that is operable independently from, or in conjunction with, the main processor. For example, in case that the electronic device 102 includes the main processor and the auxiliary processor, the auxiliary processor may be set to consume less power than the main processor, or to be specific to a designated function. The auxiliary processor may be implemented as separate from the main processor, or as a portion of the main processor.

According to an embodiment, memory 114 may store various data used by at least one component (e.g., the processor 112) of the electronic device 101. Data may include, for example, software (e.g., the program 115) and input data or output data for a command related thereto.

The program 115 may be stored in the memory 114 as software, and may include, for example, an operating system 118, middleware 117, or an application 116.

According to an embodiment, a battery/a power management module 119 may manage power supplied to the electronic device 102. According to an embodiment, the battery/the power management module 119 may be implemented, for example, as at least a portion of a PMIC. According to an embodiment, the battery/the power management module 119 may supply power to at least one component of the electronic device 102. According to an embodiment, the battery/the power management module 119 may include, for example, a primary cell which is not rechargeable, a secondary cell which is rechargeable, or a fuel cell.

Figure 2A:
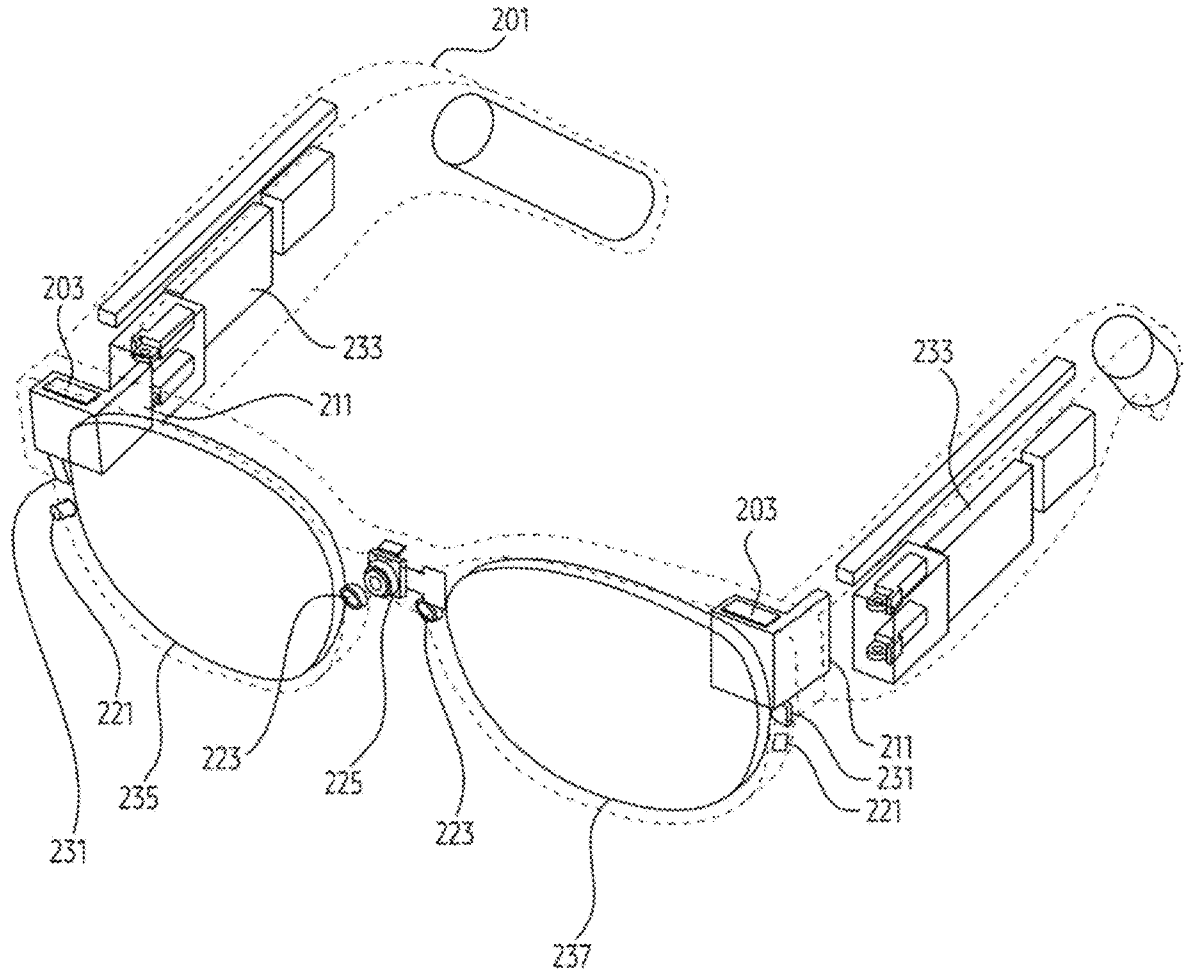
FIG. 2A illustrates an example of a wearable electronic device for providing a virtual image, according to an embodiment.

FIG. 2A illustrates an example of a wearable electronic device for providing a virtual image, according to an embodiment.

Referring to FIG. 2A, an electronic device 201 for providing a virtual image may include a display 203, an optical waveguide 211, a first camera unit 221, a second camera unit 223, a third camera unit 225, a light emitting unit 231, a printed circuit board 233, a first transparent member 235, and a second transparent member 237. The electronic device 201 for providing the virtual image may be an AR glasses.

The display 203 may include, for example, a liquid crystal display (LCD), a digital mirror device (DMD), a liquid crystal on silicon (LCoS), an organic light emitting diode (OLED), or a micro light emitting diode (micro LED). In an embodiment, in a case that the display 203 is composed of one of the liquid crystal display, the digital mirror device, or the liquid crystal on silicon, the electronic device 201 may include a light source that irradiates light to a screen output area of the display 203.

In another embodiment, in a case that the display 203 capable of generating light by itself, for example, in a case that the display is composed of one of the OLED or the micro LED, the electronic device 201 may provide a virtual video of good quality to a user even without including a separate light source. In an embodiment, if the display 203 is implemented as the OLED or the micro LED, the light source is unnecessary, and thus the electronic device 201 may be lightweight. The electronic device 201 may include the display 203, the first transparent member 235, and/or the second transparent member 237, and the user may use the electronic device 201 in a state of wearing the electronic device 201 on a face of the user. The first transparent member 235 and/or the second transparent member 237 may be formed of a glass plate, a plastic plate, or a polymer, and may be manufactured to be transparent or translucent.

According to an embodiment, the first transparent member 235 may be disposed to face a right eye of the user, and the second transparent member 237 may be disposed to face a left eye of the user. According to one or more embodiments, in a case that the display 203 is transparent, the display may be disposed in a position facing the eyes of the user to configure a screen display unit.

The optical waveguide 211 may serve to transmit a light source generated by the display 203 to the eyes of the user. The optical waveguide 211 may be made of glass, plastic, or the polymer, and may include a nanopattern formed on a portion of an external surface of the inside or the outside, for example, a grating structure having a polygonal or a curved shape. According to an embodiment, light incident on an end of a waveguide may be propagated inside the optical waveguide 211 of the display 203 by the nanopattern, to be provided to the user. In addition, the optical waveguide 211 configured with a free-form prism may provide the incident light to the user through a reflection mirror. The optical waveguide 211 may include at least one of at least one diffractive element (e.g., a diffractive optical element (DOE), a holographic optical element (HOE)), or a reflective element (e.g., a reflective mirror). The optical waveguide 211 may guide display light emitted from a light emitting unit to the eyes of the user by using at least one diffractive element or reflective element included in the optical waveguide 211.

According to one or more embodiments, the diffractive element may include an input optical member/an output optical member. For example, the input optical member may mean an input grating area, and the output optical member may mean an output grating area. The input grating area may serve as an input terminal that diffracts (or reflects) light emitted from the micro LED to transmit the light to a transparent member (e.g., the first transparent member 235 and the second transparent member 237) of the screen display unit. The output grating area may serve as an exit that diffracts (or reflects) the light transmitted to the transparent member (e.g., the first transparent member 235 and the second transparent member 237) of a wave guide to the eyes of the user. According to one or more embodiments, the reflective element may include a total internal reflection optical element or a total internal reflection waveguide for total internal reflection (TIR). For example, the total internal reflection, which is a method of guiding light, may mean that an incident angle is created such that the light (e.g., the virtual video) inputted through the input grating area is 100% reflected from a surface (e.g., a specific surface) of the wave guide, and is 100% transmitted to the output grating area. In an embodiment, light emitted from the display 203 may be guided by an optical path to the wave guide through the input optical member. The light moving inside the wave guide may be guided in a direction of the eyes of the user through the output optical member. The screen display unit may be determined based on the light emitted in the direction of the eyes.

The first camera unit 221 may include a recognition camera. The recognition camera may be used for head tracking, hand detection and tracking, controller tracking, and spatial recognition of a ‘3 degrees of freedom’ (3 DOF) and a ‘6 degrees of freedom’ (6 DOF). The recognition camera may be a global shutter (GS) camera. Since a stereo camera is required for the head tracking and the spatial recognition, two or more GS cameras may be used. The GS camera may detect a fast motion and a fine movement. The GS camera may reduce a motion blur phenomenon. The first camera unit 221 may perform the spatial recognition for the 6 DOF and a ‘simultaneous localization and mapping’ (SLAM) function through depth shooting. Also, the first camera unit 221 may perform a user gesture recognition function. According to an embodiment, at least one processor may track light emitted from a light source of a controller through the first camera unit 221. The at least one processor may track a movement of the controller through the first camera unit 221.

The second camera unit 223 may include an eye tracking (ET) camera. The ET camera may detect and track a pupil. The ET camera may be used to ensure that a center of the virtual video projected on the AR glasses is positioned according to a direction in which the pupils of a wearer of the AR glasses are staring. The second camera unit 223 may include a GS camera to detect the pupil and track the fast pupil movement. The GS camera may detect a fast motion and a fine movement. The GS camera may reduce a motion blur phenomenon. The ET camera may be installed for a left eye and a right eye, respectively. A performance and a standard of a left-eye camera and a right-eye camera may be the same.

The third camera unit 225 may include a camera for shooting. The third camera unit 225 is referred to as a high resolution (HR) or a photo video (PV), and a high-resolution camera may be used. In the third camera unit 225, a camera equipped with functions for obtaining a high-quality video, such as an auto focus (AF) function and an optical image stabilization (OIS) and the like may be used. The third camera unit 225 may be a GS camera. The third camera unit 225 may be a rolling shutter (RS) camera. A light detection and ranging (Lidar) sensor may be disposed instead of the camera at a position where the third camera unit 225 is disposed.

The light emitting unit 231 has various uses according to an attached position. In an embodiment, the light emitting unit 231 attached around an AR glasses frame may be used as an auxiliary means for facilitating gaze detection when tracking eye movement with the ET camera. In the light emitting unit 231, an infrared radiation light emitting diode (IR LED) may be used. In another embodiment, the light emitting unit 231 may be attached adjacent to a camera mounted around a hinge connecting the frame and a temple, or around a bridge connecting the frame. The light emitting unit 231 may be used as a means for supplementing ambient brightness during camera shooting. The light emitting unit 231 may be used in a case that subject detection is not easy due to a dark environment.

The printed circuit board 233 may be disposed in a temple of the glasses and may transmit an electrical signal to each module (e.g., a camera module, a display module, an audio module, and/or a sensor module) and another printed circuit board 233 through the printed circuit board 233. According to one or more embodiments, at least one printed circuit board 233 may be in a form including a first substrate, a second substrate, and an interposer disposed between the first substrate and the second substrate.

The electronic device 201 for providing the virtual image may include a microphone, a speaker, a battery, an antenna, and/or a sensor. The sensor may include an acceleration sensor, a gyro sensor, and/or a touch sensor.

Figure 2B:
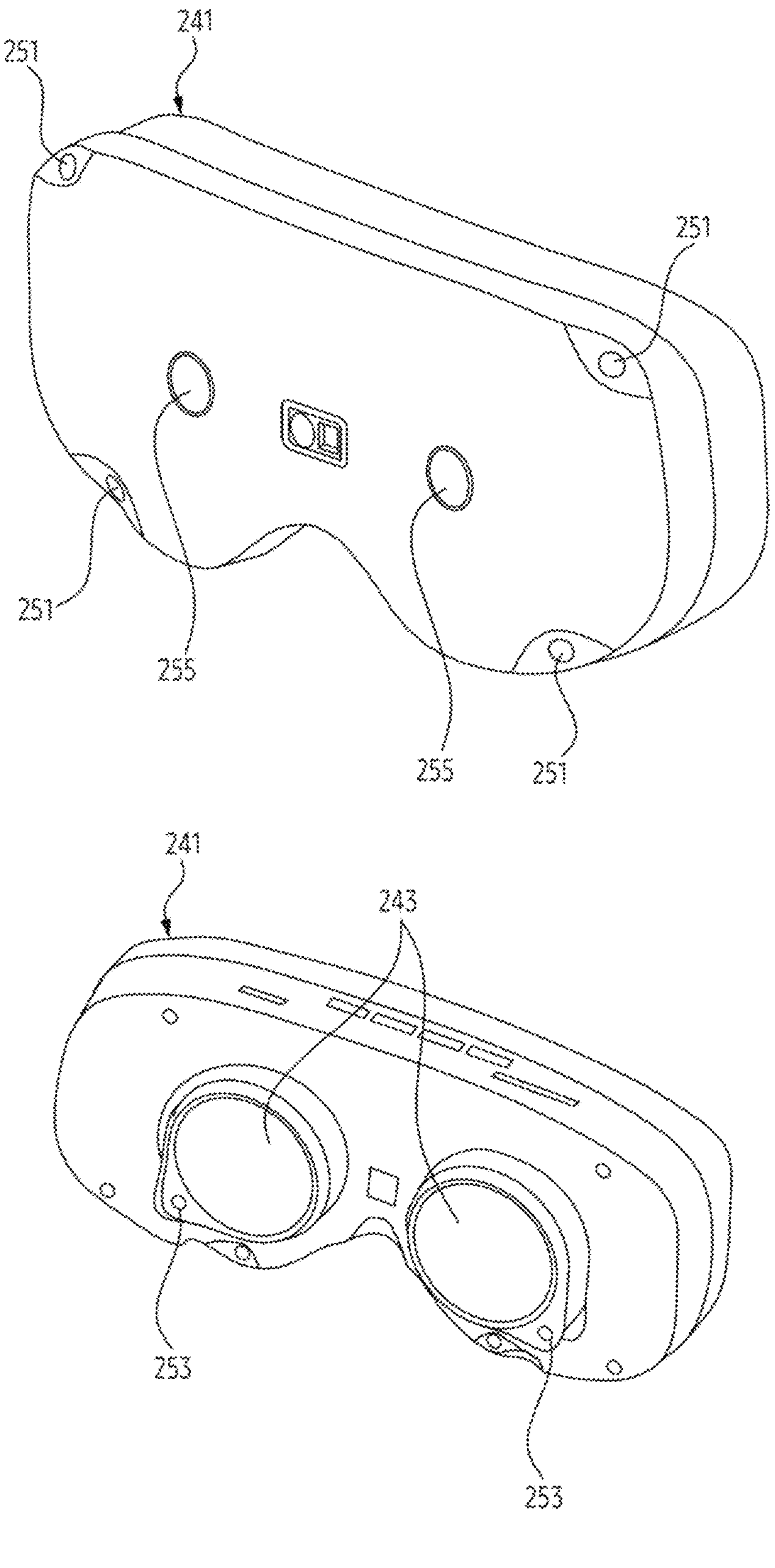
FIG. 2B illustrates an example of an electronic device for providing a virtual image, according to an embodiment.

FIG. 2B illustrates an electronic device for providing a virtual image, according to an embodiment.

Referring to FIG. 2B, an electronic device 241 for providing the virtual image may be in a form that closely contacts with the eyes of the user in case of being worn by the user. A display 243 may display the virtual image. A first camera unit 251, a second camera unit 253, and a third camera unit 255 may be included in the electronic device 241 for providing the virtual image. The display 243 and the second camera unit 253 may be disposed on a first surface of the electronic device 241 for providing the virtual image. The first camera unit 251 and the third camera unit 255 may be disposed on a second surface of the electronic device 241 for providing the virtual image. The first surface may be disposed to face the user's face when the electronic device 241 for providing the virtual image is worn by the user. The second surface may be opposite to the first surface. The second surface may be a surface spaced apart from the first surface.

For example, the display 243 may include the LCD, the DMD, the LCos, the OLED, or the micro LED. In an embodiment, in a case that the display 243 is formed of one of the liquid crystal display, the digital mirror device, or the liquid crystal on silicon, the electronic device 241 may include a light source that irradiates light to a screen output area of the display 243.

In another embodiment, in a case that the display 243 is capable of generating light by itself, for example, in a case that the display 243 is composed of one of the OLED or the micro LED, the electronic device 241 may provide a virtual video of good quality to the user even without including a separate light source. In an embodiment, if the display 243 is implemented as the OLED or the micro LED, the light source is unnecessary, and thus the electronic device 241 may be lightweight. The electronic device 241 may include the display 243. The user may use the electronic device 241 in a state of wearing the electronic device 241 on the face of the user. The first transparent member 235 and/or the second transparent member 237 may be formed of the glass plate, the plastic plate, or the polymer, and may be manufactured to be transparent or translucent.

According to an embodiment, the first transparent member 235 may be disposed to face the right eye of the user, and the second transparent member 237 may be disposed to face the left eye of the user. According to one or more embodiments, in a case that the display 243 is transparent, the display 243 may be disposed at a position facing the eyes of the user to configure a screen display unit. A lens may serve to adjust focus of a screen outputted to the display. For example, the lens may be a fresnel lens. The lens may be a pancake lens. The lens may be a multi-channel lens.

The first camera unit 251 may include the recognition camera. The recognition camera may be used for the head tracking, the hand detection and the tracking, the controller tracking, and the spatial recognition of the 3 DOF, the 6 DOF. The recognition camera may be a GS camera. Since the stereo camera is required for the head tracking and the spatial recognition, two or more GS cameras may be used. The GS camera may detect a fast motion and a fine movement. The GS camera may reduce the motion blur phenomenon. The first camera unit 251 may perform the spatial recognition for the 6 DOF and the SLAM function through the depth shooting. Also, the first camera unit 251 may perform the user gesture recognition function. According to an embodiment, the at least one processor may track light emitted from the light source of the controller through the first camera unit 221. The at least one processor may track the movement of the controller through the first camera unit 221.

The second camera unit 253 may include the ET camera. The ET camera may detect and track the pupil. The ET camera may be used to ensure that the center of the virtual video projected on the AR glasses is positioned according to the direction in which the pupils of the wearer of the AR glasses are staring. The second camera unit 253 may include the GS camera to detect the pupil and track the fast pupil movement. The GS camera may detect a fast motion and a fine movement. The GS camera may reduce the motion blur phenomenon. The ET camera may be installed for the left eye and the right eye, respectively. The performance and the standard of the left-eye camera and the right-eye camera may be the same.

The third camera unit 255 may include the camera for shooting. The third camera unit 255 is referred to as the HR or the PV, and the high-resolution camera may be used. In the third camera unit 255, a camera equipped with the functions for obtaining the high-quality video, such as the AF function and the OIS and the like may be used. The third camera unit 225 may be the GS camera. The third camera unit 255 may be the RS camera. A light detection and ranging ("Lidar") sensor may be disposed instead of the camera at a position where the third camera unit 255 is disposed.

The electronic device 241 for providing the virtual image may include a microphone, a speaker, a battery, an antenna, and/or a sensor. The sensor may include an acceleration sensor, a gyro sensor, and/or a touch sensor.

Figure 3:
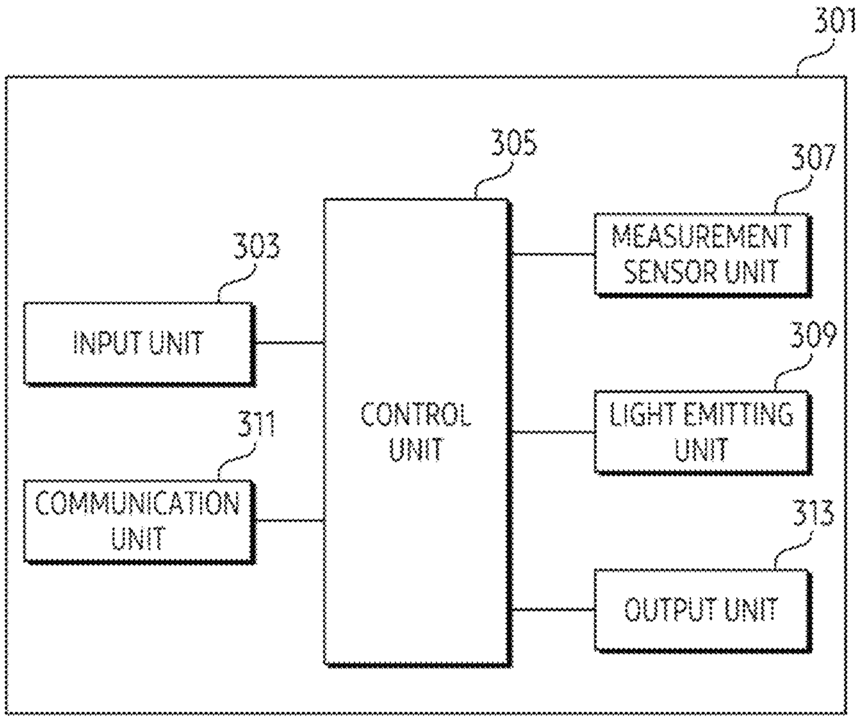
FIG. 3 illustrates a functional configuration of a user input device for tracking a movement of a user, according to an embodiment.

FIG. 3 illustrates a functional configuration of a user input device for tracking a movement of a user, according to an embodiment.

Referring to FIG. 3, a user input device 301 may include an input unit 303, a control unit 305, a measurement sensor unit 307, a light emitting unit 309, a communication unit 311, and an output unit 313. The user input device 301 (e.g., the electronic device 103 of FIG. 1) may include the light emitting unit 309 used for tracking the movement of the user. The user input device 301 may be a controller.

The user input device 301 may include the input unit 303. The input unit 303 may be a component for receiving a user input. The user input device 301 may receive the user input through the input unit 303. For example, the input unit 303 may receive a touch input. The input unit 303 may receive a grip input. The input unit 303 may receive an input through a physical button. According to an embodiment, the input unit may be in a form that is suitable for receiving the user input. For example, the input unit 303 may be in a form of a button. The input unit 303 may be in a form of a joystick. The input unit 303 may include a touch sensor. The input unit 303 may include a grip sensor.

The user input device 301 may include the control unit 305 that may be a component for controlling each part of the user input device 301. The user input device 301 may control components of the user input device 301 through the control unit 305. According to an embodiment, the control unit 305 may control the light emitting unit 309 for effectively tracking the movement of the user. For example, in a case that a speed of the user input device 301 obtained through the measurement sensor unit 307 is greater than or equal to a threshold value, the control unit 305 may increase brightness of light emitted from the light emitting unit 309. For example, the control unit 305 may increase the brightness of the light emitted from the light emitting unit 309 based on identification of a control signal transmitted from an external electronic device. The external electronic device may be an electronic device (e.g., the electronic device 201 for providing the virtual image of FIG. 2A) for providing a virtual image. The external electronic device may be a HMD (e.g., the electronic device 201 for providing the virtual image of FIG. 2A). According to an embodiment, the control unit 305 may control the output unit 313 for providing haptic feedback based on an input of the user. For example, the control unit 305 may control the output unit 313 for providing vibration of a pattern corresponding to a motion of the user. The control unit 305 may control the output unit 313 to generate the vibration of a greater intensity as a grip pressure applied to the controller increases. The control unit 305 may control the output unit 313 to generate the vibration of the greater intensity as a width of the movement of the controller increases. The control unit 305 may control the output unit 313 to generate the vibration of the greater intensity as a speed of the controller increases. For example, the control unit 305 may control the output unit 313 for providing vibration of a corresponding pattern according to content in the virtual image. The control unit 305 may control the output unit 313 for providing vibration corresponding to a strike with respect to a virtual object in the virtual image.

The user input device 301 may include the measurement sensor unit 307. The measurement sensor unit 307 may be a component for measuring speed information of the user input device 301. The measurement sensor unit 307 may include an inertial measurement unit (IMU) sensor. The measurement sensor unit 307 may measure acceleration information through the IMU sensor and obtain the speed information of the user input device 301 by adding up the acceleration information that are accumulated. The user input device 301 may transmit the speed information measured through the measurement sensor unit 307 to the HMD.

The user input device 301 may include the light emitting unit 309. The light emitting unit 309 may be a component that emits light necessary for tracking the movement of the user. The user input device 301 emits the light through the light emitting unit 309 so that the HMD may track the movement of the user. According to an embodiment, the light emitting unit 309 may include one or more light sources. For example, the light emitting unit 309 may include one or more light sources disposed in a circular shape. According to an embodiment, the light emitting unit 309 may include light sources having a wavelength of a specific band. For example, the light emitting unit 309 may include light sources having a wavelength of an infrared band. For example, the light emitting unit 309 may include the light sources having a wavelength of a visible light band. According to an embodiment, the at least one light source may be a light emitting diode (LED). According to an embodiment, the at least one light source included in the light emitting unit 309 may periodically emit the light.

The user input device 301 (e.g., the electronic device 103 of FIG. 1) may include the communication unit 311. The communication unit 311 may be a component for a communication connection with an external electronic device (e.g., the electronic device 101 of FIG. 1 or the electronic device 201 of FIG. 2A). The user input device 301 may perform communication with an electronic device (e.g., the electronic device 101 of FIG. 1) for providing the virtual image through the communication unit 311. According to an embodiment, the user input device 301 may perform short-range wireless network communication through the communication unit 311. For example, the user input device 301 may perform Bluetooth communication with the electronic device 101 for providing the virtual image through the communication unit 311. The communication unit 311 may include a Bluetooth module. Also, for example, the user input device 301 may perform wireless LAN communication. The communication unit 311 may include a Wi-Fi module.

The user input device 301 may include the output unit 313. The output unit 313 may provide haptic feedback for interaction between the user and virtual reality. The haptic feedback may be vibration of a designated pattern. For example, the haptic feedback may be vibration of a pattern corresponding to the speed information of the user input device 301. The output unit 313 may generate vibration of the greater intensity as the speed of the controller increases. For example, the haptic feedback may be vibration of a pattern corresponding to a gesture of the user in a case that the user interacts with a virtual object on a screen of the external electronic device. The output unit 313 may generate vibration of a pattern corresponding to the received grip input. The output unit 313 may generate vibration of the greater intensity as the grip pressure applied to the controller increases. For example, the haptic feedback may be vibration of a pattern corresponding to content in the case that the user interacts with the virtual object on the screen of the external electronic device. The haptic feedback may indicate occurrence information of a specific event such as contact or a collision with the virtual object. The output unit 313 may provide vibration corresponding to the strike with respect to the virtual object in the virtual image.

Figure 4A:
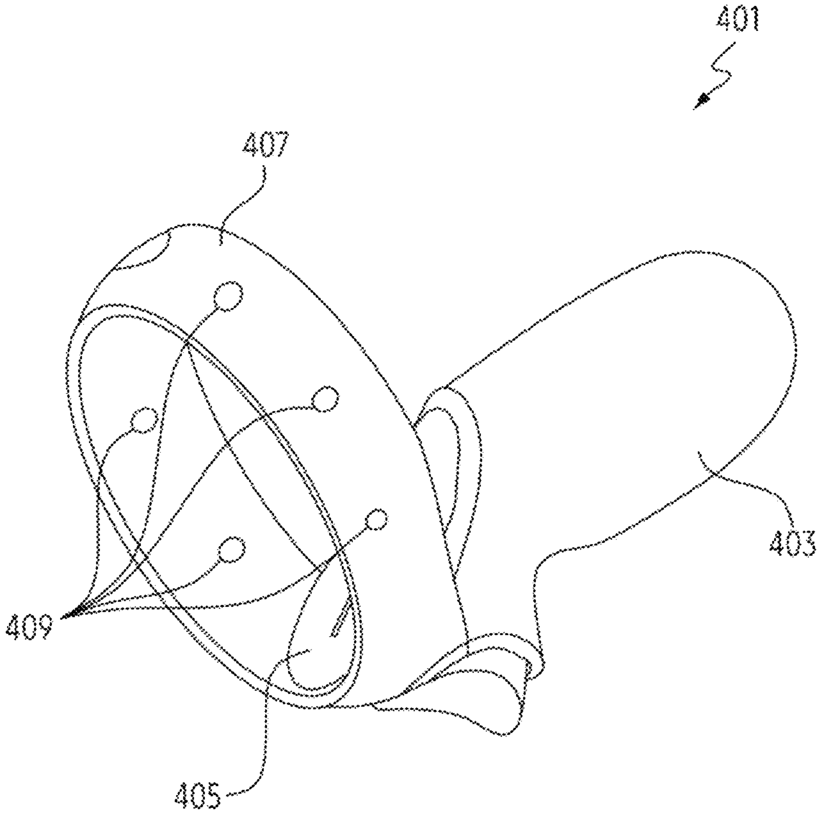
FIG. 4A illustrates an example of a user input device for tracking a movement of a user, according to an embodiment.

FIG. 4A illustrates an example of a user input device for tracking a movement of a user, according to an embodiment.

Referring to FIG. 4A, a user input device 401 (e.g., the electronic device 103 of FIG. 1) may include one or more light sources (e.g., the light emitting unit 309 of FIG. 3) used for tracking a movement of a user. A handle 403 may be a portion that may be gripped in the user input device 401. A touch pad 405 may be a portion for receiving a user input. A ring 407 may include one or more light sources 409 for tracking the movement of the user. The light source 409 may be used by an electronic device (e.g., the electronic device 101 of FIG. 1) for providing a virtual image to track the movement of the user.

According to an embodiment, the user input device 401 may be a controller. The user input device 401 may be an electronic device including a light source for tracking the movement of the user.

According to an embodiment, the handle 403 may be in a form that is capable of being gripped by the user. For example, a handle may have a cylindrical shape. The handle 403 may have a bent or a curved shape to balance a weight of the user input device 401.

According to an embodiment, the user input device 401 may receive a touch input of the user through the touch pad 405. The touch pad 405 may be attached to an end portion of the handle 403. According to an embodiment, the touch pad 405 may be a capacitive type. For example, the touch pad 405 may operate by capacitive type sensing, such as sensing a capacitive virtual ground effect of a finger of the user. A pointing position in the virtual image may be changed by the touch input of the user received through the touch pad 405.

According to an embodiment, in the ring 407, the one or more light sources 409 may be included. A camera of an external electronic device (e.g., the electronic device 101 of FIG. 1) may track a movement of the user input device 401 by detecting light emitted by the one or more light sources 409. The light source 409 may emit light in a designated wavelength band. For example, the one or more light sources 409 may emit light in an infrared wavelength band. For example, the one or more light sources 409 may emit light of approximately 380 nanometers (nm) to approximately 900 nanometers (nm).

Figure 4B:
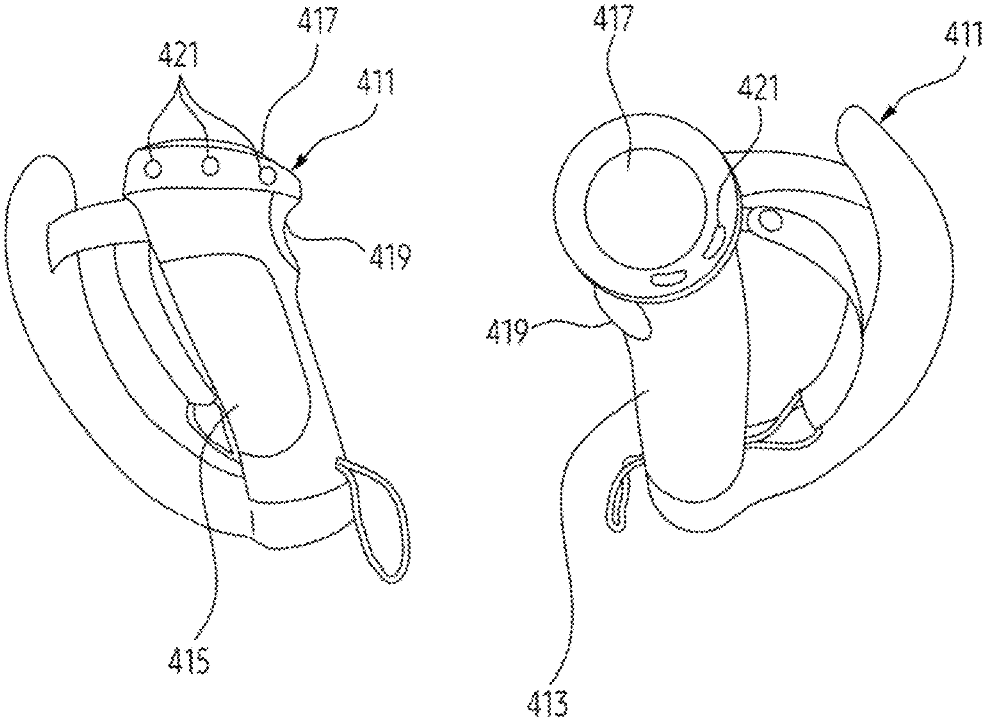
FIG. 4B illustrates an example of a user input device including a plurality of input units for tracking a movement of a user.

FIG. 4B illustrates an example of a user input device including a plurality of input units for tracking a movement of a user.

Referring to FIG. 4B, a user input device 411 (e.g., the electronic device 103 of FIG. 1) may include the one or more light sources (e.g., the light emitting unit 309 of FIG. 3) used for tracking the movement of the user. A handle 413 may be a portion that may be gripped in the user input device 411. A first input unit 415, a second input unit 417, a third input unit 419 may be portions for receiving an input through a physical button of the user. A light source 421 may be included in the user input device 411 for an external electronic device (e.g., an HMD) to track the movement of the user.

According to an embodiment, the user input device 411 may be a controller. The user input device 411 may be an electronic device including a light source for tracking the movement of the user.

According to an embodiment, the handle 413 may be in a form capable of being gripped by the user. For example, the handle may have the cylindrical shape. The handle 413 may have a bent or curved shape to balance a weight of the user input device 411.

According to an embodiment, the user input device 411 may receive an input through a physical button of the user through the first input unit 415, the second input unit 417, and the third input unit 419. The first input unit 415, the second input unit 417, and the third input unit 419 may include a pressure sensor.

According to an embodiment, one or more light sources 421 may be included in the user input device 411. An electronic device (e.g., the electronic device 101 of FIG. 1) for providing the virtual image may track a movement of the user input device 411 by detecting light emitted by the one or more light sources 421 through a camera. The one or more light sources 421 may emit light in the designated wavelength band. For example, the one or more light sources 421 may emit light of approximately 780 nanometers (nm) to approximately 1000 nanometers (nm). For example, the one or more light sources 421 may emit light of approximately 380 nanometers (nm) to approximately 900 nanometers (nm).

Figure 5:
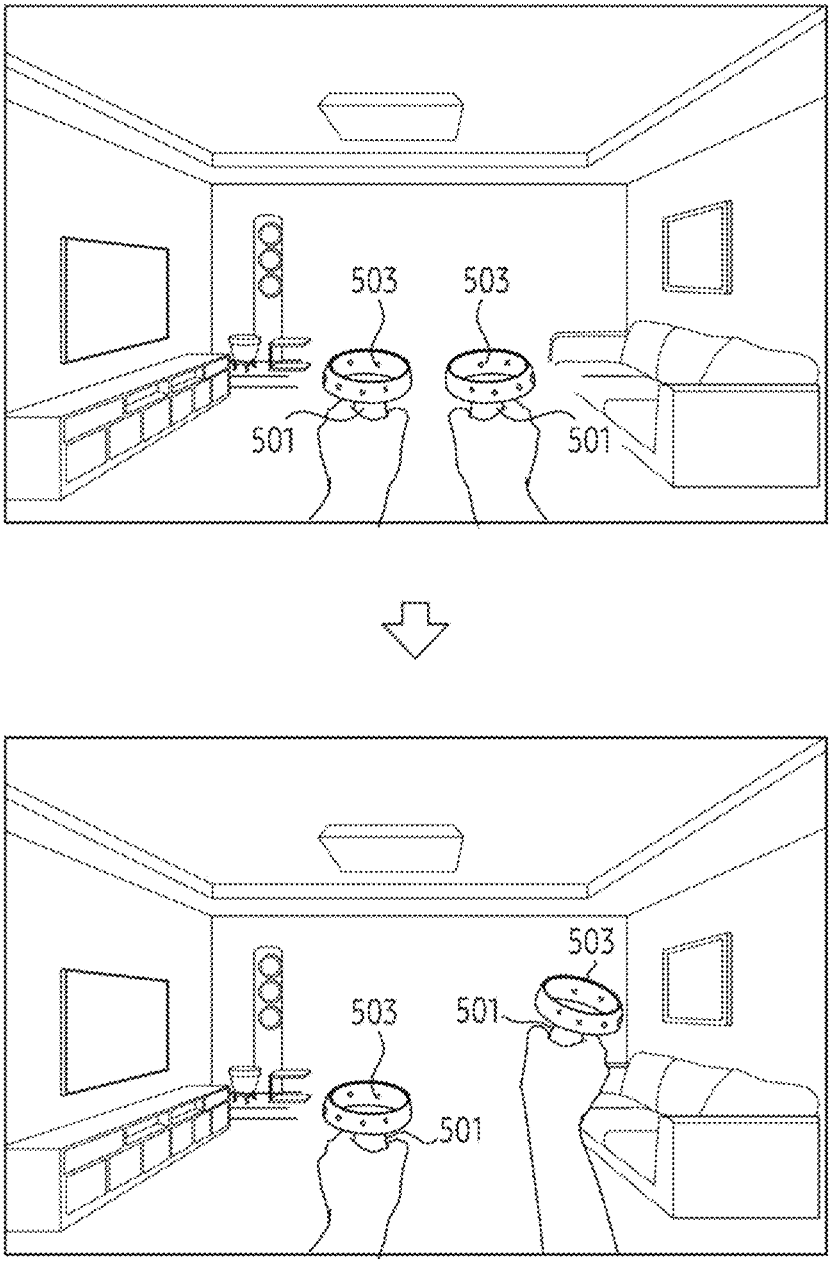
FIG. 5 illustrates an example of tracking a movement of a user using a controller, according to an embodiment.

FIG. 5 illustrates an example of tracking a movement of a user using a controller, according to an embodiment.

Referring to FIG. 5, a user input device 501 (e.g., the electronic device 103 of FIG. 1) may include one or more light sources 503 (e.g., the light emitting unit 309 of FIG. 3) used for tracking a movement of a user. For example, the user input device 501 may be the controller 401 illustrated in FIG. 4A.

According to an embodiment, the user may grip the user input device 501. The user may wear the user input device 501. A movement of the user input device 501 may occur by the movement of the user. Therefore, in a case that the movement of the user input device 501 is tracked, the movement of the user may be tracked.

According to an embodiment, the movement of the user may be tracked through the user input device 501. The tracked movement of the user may be inputted to a processor and may be reflected in a graphic. For example, the tracked movement of the user may change a pointing position of virtual reality. For example, the tracked movement of the user may be inputted as a motion of the user in the virtual reality. A device (e.g., the electronic device 101 of FIG. 1) for providing the virtual image may perform a designated function based on a tracking result of the tracked movement of the user. The function may be recognition of the movement of the user, or an operation based on the recognition of the movement of the user.

According to an embodiment, the user movement may be tracked through tracking of the one or more light sources 503. The one or more light sources 503 may emit light in a designated wavelength band. For example, the one or more light sources 503 may emit the light of approximately 780 nanometers (nm) to 1000 nanometers (nm). For example, the one or more light sources 503 may emit the light of approximately 380 nanometers (nm) to approximately 900 nanometers (nm). The electronic device 101 for providing the virtual image may track the light emitted from the one or more light sources 503 through a camera (e.g., the second camera unit 223 of FIG. 2A). The electronic device 101 for providing the virtual image may be a HMD. The electronic device 101 for providing the virtual image may be AR glasses. The camera 223 may be a global shutter (GS) camera.

According to embodiments, in a case that a movement speed of the user is fast, a movement speed of the user input device 501 may be fast. In a case that the movement speed of the user input device 501 is fast, a blur phenomenon may occur in an image obtained through the camera 223 of the electronic device 101 for providing the virtual image. The electronic device 101 for providing the virtual image may be the HMD. According to an embodiment, the electronic device 101 (e.g., the HMD) for providing the virtual image may change a setting of the camera 223 of the electronic device 101 for providing the virtual image, in the case that movement speed information of the user input device 501 is greater than or equal to a threshold value, in order to solve the blur phenomenon. For example, the electronic device 101 (e.g., the HMD) for providing the virtual image may change a frame length included in the camera setting from a first frame length to a second frame length. In a case that the movement speed information of the user input device 501 is greater than or equal to the threshold value, the second frame length may be shorter than the first frame length. For example, an exposure value may be changed from a first exposure value received during the first frame length to a second exposure value received during the second frame length. In a case that the movement speed information of the user input device 501 is greater than or equal to the threshold value, the second exposure value may be smaller than the first exposure value.

According to an embodiment, in order to solve the blur phenomenon, the user input device 501 may adjust brightness of light emitted from a light source included in the user input device 501 in the case that the movement speed information of the user input device 501 is greater than or equal to the threshold value. For example, in the case that the movement speed information of the user input device 501 is greater than or equal to the threshold value, the brightness of the light emitted from the light source included in the user input device 501 may be increased. In the case that the movement speed information of the user input device 501 is greater than or equal to the threshold value, since the length of the frame of the camera 223 was shortened, the exposure value received during the shortened frame length may decrease. Therefore, the user input device 501 may increase the brightness of the light emitted from the light source included in the user input device 501 to improve a tracking performance of the user input device 501.

According to an embodiment, the electronic device 101 for providing the virtual image may generate a control signal for increasing the brightness of the light emitted from the light source included in the user input device 501, in the case that the movement speed information of the user input device 501 is greater than or equal to the threshold value, in order to solve the blur phenomenon. The electronic device 101 for providing the virtual image may transmit the control signal to the user input device 501. According to an embodiment, the user input device 501 may receive the control signal from the electronic device 101 for providing the virtual image. The user input device 501 may adjust the brightness of light emitted from the one or more light sources based on the received control signal.

Figure 6:
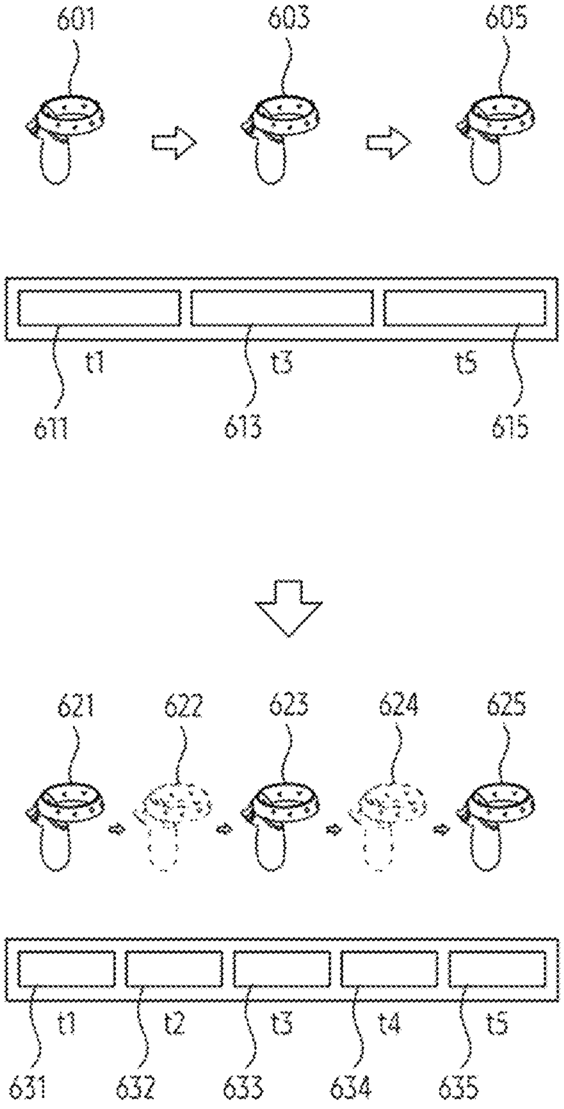
FIG. 6 illustrates an effect according to a reduction in a frame length, according to an embodiment.

FIG. 6 illustrates an effect according to a reduction in a frame length, according to an embodiment.

Referring to FIG. 6, a user input device (e.g., the user input device 401 of FIG. 4A) may be at a first position 601 at a time t1. The user input device 401 may be at a second position 603 at a time t3. The user input device 401 may be at a third position 605 at a time t5. A first frame 611, a second frame 613, and a third frame 615 may be frames obtained by a camera between the time t1 and the time t5.

According to an embodiment, a movement of the user input device 401 may be tracked through the first frame 611, the second frame 613, and the third frame 615. A length of the first frame 611, a length of the second frame 613, and a length of the third frame 615 may be the same.

In a case that a speed of the user input device 401 is fast, a blur phenomenon may occur in an image obtained from a camera (e.g., the second camera unit 223 of FIG. 2A). In a case that the blur phenomenon occurs in the image obtained from a camera 223, tracking of the user input device 401 may be difficult. According to an embodiment, in order to prevent the blur phenomenon, in a case that the speed of the user input device 401 is greater than or equal to a threshold value, the electronic device 101 (e.g., a HMD) for providing a virtual image may reduce a frame length of the camera 223 of the electronic device 101 for providing the virtual image.

The user input device 401 may be at a first position 621 at a time t1. The user input device 401 may be at a second position 622 at a time t2. The user input device 401 may be at a third position 623 at a time t3. The user input device 401 may be at a fourth position 624 at a time t4. The user input device 401 may be at a fifth position 625 at a time t5. A first frame 631, a second frame 632, a third frame 633, a fourth frame 634, and a fifth frame 635 may be frames obtained by the camera 223 between the time t1 and the time t5.

According to an embodiment, the movement of the user input device 401 may be tracked through the first frame 631, the second frame 632, the third frame 633, the fourth frame 634, and the fifth frame 635. A length of the first frame 631, a length of the second frame 632, a length of the third frame 633, a length of the fourth frame 634, and a length of the fifth frame 635 may be the same. The length of the first frame 631, the length of the second frame 632, the length of the third frame 633, the length of the fourth frame 634, and the length of the fifth frame 635 may be shorter than the length of the first frame 611, the length of the second frame 613, and the length of the third frame 615.

In a case that a length of a frame is shortened, a distance between a position of the user input device 401 at a start time of a corresponding frame and a position of the user input device 401 at an end time of the corresponding frame may be shortened. Therefore, the blur phenomenon may be reduced. In a case that the length of the frame is shortened, an exposure value of the camera 223 may be reduced. In a case that speed information is greater than or equal to a threshold value, as the length of the frame is set to be shorter than a previous length, the exposure value received during the length of the frame may decrease. As the exposure value decreases, the user input device 401 may increase brightness of light emitted from the user input device 401 to improve a tracking performance of the user input device 401. In a case that the speed information is smaller than the threshold value, as the length of the frame is set to be longer than the previous length, the exposure value received during the length of the frame may increase. As the exposure value increases, the user input device 401 may lower the brightness of the light emitted from the user input device 401 for power efficiency.

Figure 7:
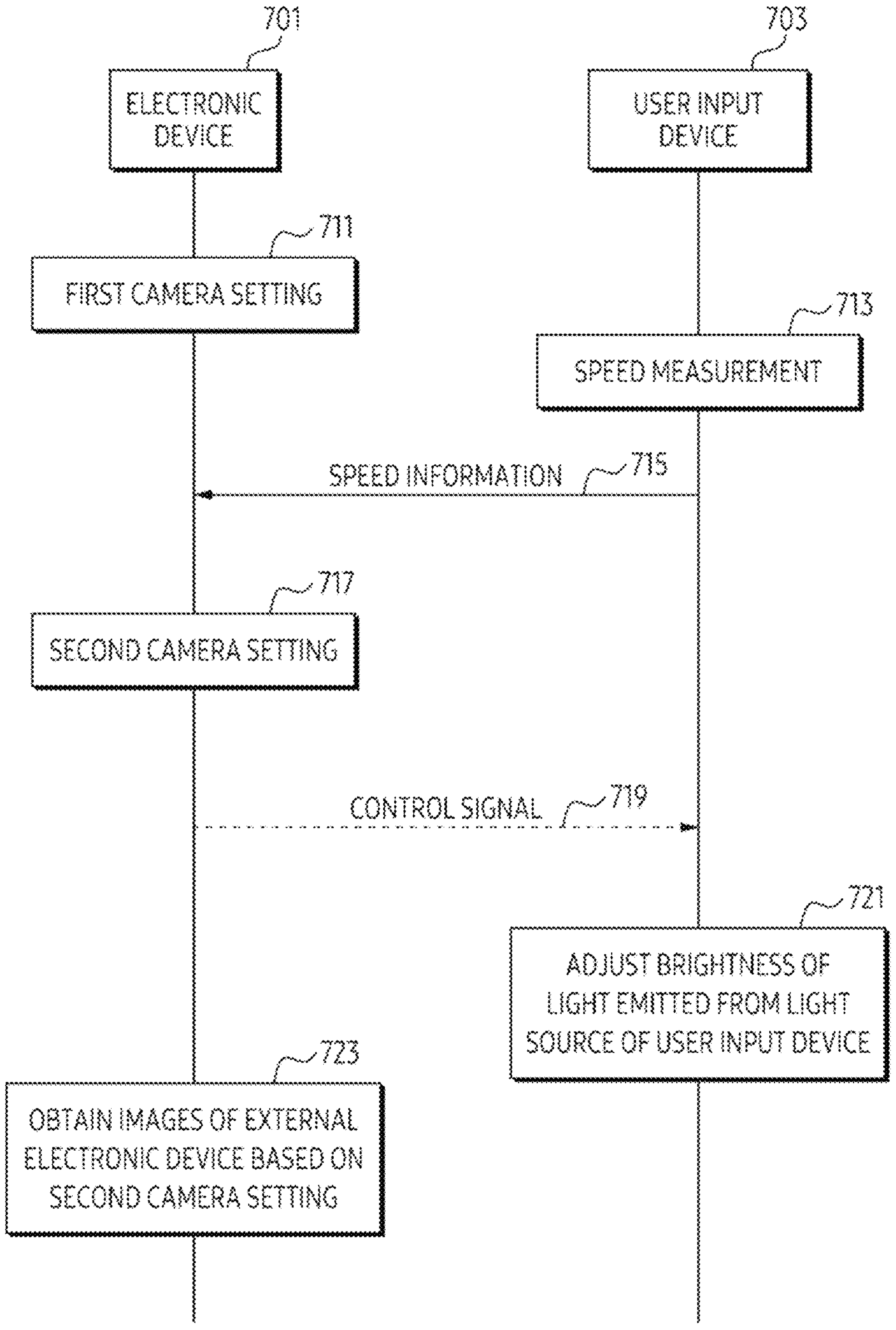
FIG. 7 illustrates an example of communication between an electronic device for providing a virtual image and a user input device, according to an embodiment.

FIG. 7 illustrates an example of communication between an electronic device for providing a virtual image and a user input device, according to an embodiment.

Referring to FIG. 7, an electronic device 701 for providing a virtual image may be a HMD (e.g., the electronic device 241 of FIG. 2B). The electronic device 701 for providing the virtual image may be AR glasses (e.g., the electronic device 201 of FIG. 2A). A user input device 703 may be a controller (e.g., the user input device 401 of FIG. 4A).

In an operation 711, the electronic device 701 for providing the virtual image may obtain an image for the user input device 703 based on a first camera setting. The electronic device 701 for providing the virtual image may obtain the image through a camera (e.g., the camera module 180 of FIG. 1) for tracking of the user input device 703. According to an embodiment, in a case that a movement of the user input device 703 is detected in a field of view (FOV) of a camera (e.g., the first camera unit 221, the second camera unit 223, or the third camera unit 225 of FIG. 2A, and the first camera unit 251, the second camera unit 253, or the third camera unit 255 of FIG. 2B) included in the electronic device 701 for providing the virtual image, the electronic device 701 for providing the virtual image may obtain an image for the user input device 703 based on the first camera setting.

In an operation 713, the user input device 703 may obtain speed information of the user input device 703. The user input device 703 may obtain the speed information through a measurement sensor unit (e.g., an IMU sensor) (e.g., the measurement sensor unit 307 of FIG. 3). The measurement sensor unit (e.g., the IMU sensor) may measure acceleration information, and obtain the speed information of the user input device 703 by adding up the acceleration information that are accumulated. According to embodiments, a measurement sensor unit 307 may obtain the speed information at a predetermined time point.

According to an embodiment, the measurement sensor unit 307 may obtain the speed information every designated period. For example, the measurement sensor unit 307 may obtain the speed information approximately once every 1 millisecond (ms). According to an embodiment, the measurement sensor unit 307 may obtain the speed information based on a user input. For example, the measurement sensor unit 307 may obtain the speed information based on reception of a touch input. For example, the measurement sensor unit 307 may obtain the speed information based on an input through a physical button.

According to an embodiment, the measurement sensor unit 307 may obtain the speed information based on whether an event has occurred. For example, the measurement sensor unit 307 may obtain the speed information based on content in the virtual image. For example, the measurement sensor unit 307 may obtain the speed information based on a strike with respect to a virtual object. According to an embodiment, the speed information may include information on a speed level of the user input device 703. According to an embodiment, the speed information of the user input device 703 may be divided into a plurality of sections. The one section may correspond to one speed level.

According to an embodiment, the speed information may include information on one of a plurality of speed levels of the user input device 703. For example, the speed information may include information on one of two speed levels of the user input device 703. For example, the speed information may include information on one of three speed levels of the user input device 703. For example, the speed information may include information on one of four speed levels of the user input device 703. For example, the speed level of the user input device 703 may correspond to a first speed level in a case that the speed is smaller than a first threshold value, a second speed level in a case that the speed is greater than or equal to the first threshold value and is smaller than a second threshold value, a third speed level in a case that the speed is greater than or equal to the second threshold value and is smaller than a third threshold value, and a fourth speed level in a case that the speed is greater than or equal to the third threshold value.

According to embodiments, the speed information may include a designated speed information type. According to an embodiment, the speed information may include information on a movement speed and acceleration of the user input device 703. According to an embodiment, the speed information may include information on a rotation speed of the user input device 703. According to an embodiment, the speed information may include information on whether a speed of the user input device 703 exceeds a threshold value. The threshold value may be the first threshold value for distinguishing two speed levels when the speed information of the user input device 703 is divided into two sections. For example, the speed information may include information on whether the speed of the user input device 703 exceeds approximately 0.3 m/s.

In an operation 715, the user input device 703 may transmit the speed information of the user input device 703 to the electronic device 701 for providing the virtual image. The electronic device 701 for providing the virtual image may receive the speed information of the user input device 703 from the user input device 703. According to embodiments, the user input device 703 may transmit the speed information of the user input device 703 to the electronic device 701 for providing the virtual image through a designated communication method.

According to an embodiment, the user input device 703 may transmit the speed information of the user input device 703 to the electronic device 701 for providing the virtual image through a Bluetooth communication method. The user input device 703 may transmit the speed information of the user input device 703 to the electronic device 701 for providing the virtual image through a Wi-Fi communication method. The user input device 703 may transmit the speed information of the user input device 703 to the electronic device 701 for providing the virtual image through an ultra-wide band (UWB) communication method. The user input device 703 may transmit the speed information of the user input device 703 to the electronic device 701 for providing the virtual image through a cellular communication method. According to embodiments, the user input device 703 may transmit the speed information of the user input device 703 to the electronic device 701 for providing the virtual image at a designated time point. According to an embodiment, the user input device 703 may transmit the speed information of the user input device 703 to the electronic device 701 for providing the virtual image every designated period. For example, the user input device 703 may transmit the speed information of the user input device 703 to the electronic device 701 for providing the virtual image once every approximately 2 milliseconds (ms). The user input device 703 may transmit the speed information of the user input device 703 to the electronic device 701 for providing the virtual image based on identifying that the speed information of the user input device 703 is greater than or equal to the threshold value. For example, the user input device 703 may transmit the speed information to the electronic device 701 for providing the virtual image only in a case that the speed of the user input device 703 is approximately 0.3 m/s or more. The user input device 703 may not transmit the speed information of the user input device 703 based on identifying that the speed information of the user input device 703 is smaller than the threshold value. For example, the user input device 703 may not transmit the speed information to the electronic device 701 for providing the virtual image based on identifying that the speed of the user input device 703 is smaller than approximately 0.3 m/s. According to an embodiment, the speed information of the user input device 703 may be divided into the plurality of sections. The one section may correspond to one speed level. According to an embodiment, the speed information may include information on one of the plurality of speed levels of the user input device 703. For example, the speed information may include information on one of the two speed levels of the user input device 703. For example, the speed information may include information on one of the three speed levels of the user input device 703. For example, the speed information may include information on one of the four speed levels of the user input device 703. For example, the speed level of the user input device 703 may correspond to the first speed level in the case that the speed is smaller than the first threshold value, the second speed level in the case that the speed is greater than or equal to the first threshold value and is smaller than the second threshold value, the third speed level in the case that the speed is greater than or equal to the second threshold value and is smaller than the third threshold value, and the fourth speed level in the case that the speed is greater than or equal to the third threshold value. According to embodiments, the speed information may include the designated speed information type. According to an embodiment, the speed information may include the information on the movement speed and the acceleration of the user input device 703. According to an embodiment, the speed information may include the information on the rotation speed of the user input device 703. According to an embodiment, the speed information may include the information on whether the speed of the user input device 703 exceeds the threshold value. For example, the speed information may include information on whether the speed of the user input device 703 exceeds approximately 0.3 m/s.

In an operation 717, the electronic device 701 for providing the virtual image may change a camera setting from the first camera setting to a second camera setting based on the received speed information of the user input device 703. The first camera setting may include a first frame length. The second camera setting may include a second frame length. The first camera setting may include a first exposure value. The second camera setting may include a second exposure value. In a case that the speed information is greater than or equal to the threshold value, the second frame may be shorter than the first frame. In the case that the speed information is greater than or equal to the threshold value, the second frame length may be shorter than the first frame length. In the case that the speed information is greater than or equal to the threshold value, the second exposure value may be smaller than the first exposure value. In a case that the speed information is smaller than the threshold value, the second frame length may be longer than the first frame length. In the case that the speed information is greater than or equal to the threshold value, the second exposure value received during the second frame length may be greater than the first exposure value received during the first frame length. According to embodiments, the electronic device 701 for providing the virtual image may change the camera setting from the first camera setting to the second camera setting within a designated time. According to an embodiment, the electronic device 701 for providing the virtual image may gradually change the camera setting from the first camera setting to the second camera setting over the designated time. For example, the electronic device 701 for providing the virtual image may change the camera setting from the first camera setting to the second camera setting over 3 seconds. For example, the electronic device 701 for providing the virtual image may change a length of a frame from the first frame length to the second frame length over 3 seconds. For example, the electronic device 701 for providing the virtual image may change an exposure value from the first exposure value to the second exposure value over 3 seconds. According to an embodiment, the electronic device 701 for providing the virtual image may change the camera setting from the first camera setting to the second camera setting. For example, the electronic device 701 for providing the virtual image may change the camera setting from the first camera setting to the second camera setting within one second. For example, the electronic device 701 for providing the virtual image may change the length of the frame from the first frame length to the second frame length within 1 second. For example, the electronic device 701 for providing the virtual image may change the exposure value from the first exposure value to the second exposure value within 1 second.

In an operation 719, the electronic device 701 for providing the virtual image may transmit a control signal for adjusting brightness of light emitted from the user input device 703. The user input device 703 may receive the control signal for adjusting the brightness of light emitted from the user input device 703 from the electronic device 701 for providing the virtual image. According to embodiments, the electronic device 701 for providing the virtual image may transmit the control signal for adjusting the brightness of the light emitted from the user input device 703 to the user input device 703 through the designated communication method. According to an embodiment, the electronic device 701 for providing the virtual image may transmit the control signal for adjusting the brightness of the light emitted from the user input device 703 to the user input device 703 through the Bluetooth communication method. The electronic device 701 for providing the virtual image may transmit the control signal for adjusting the brightness of the light emitted from the user input device 703 to the user input device 703 through the Wi-Fi communication method. The electronic device 701 for providing the virtual image may transmit the control signal for adjusting the brightness of the light emitted from the user input device 703 to the user input device 703 through the UWB communication method. The electronic device 701 for providing the virtual image may transmit the control signal for adjusting the brightness of the light emitted from the user input device 703 to the user input device 703 through the cellular communication method.

According to embodiments, the electronic device 701 for providing the virtual image may transmit the control signal for adjusting the brightness of the light emitted from the user input device 703 to the user input device 703 at a predetermined time point. For example, the electronic device 701 for providing the virtual image may transmit the control signal for adjusting the brightness of the light emitted from the user input device 703 to the user input device 703 once every approximately 2 milliseconds (ms). According to embodiments, the electronic device 701 for providing the virtual image may transmit the control signal for adjusting the brightness of the light emitted from the user input device 703 based on the speed information. According to an embodiment, the electronic device 701 for providing the virtual image may transmit the control signal for adjusting the brightness of the light emitted from the user input device 703 to the user input device 703 based on identifying that the speed information of the user input device 703 is greater than or equal to the threshold value. For example, the electronic device 701 for providing the virtual image may transmit the control signal for adjusting the brightness of the light emitted from the user input device 703 to the user input device 703 only in the case that the speed of the user input device 703 is approximately 0.3 m/s or more. According to an embodiment, the electronic device 701 for providing the virtual image may not transmit the control signal for adjusting the brightness of the light emitted from the user input device 703 to the user input device 703 based on identifying that the speed information of the user input device 703 is smaller than the threshold value. For example, the electronic device 701 for providing the virtual image may not transmit the control signal for adjusting the brightness of the light emitted from the user input device 703 to the user input device 703 based on the speed of the user input device 703 being smaller than approximately 0.3 m/s. According to an embodiment, the speed information of the user input device 703 may be divided into the plurality of sections. The one section may correspond to one speed level. According to an embodiment, the speed information may include the information on one of the plurality of speed levels of the user input device 703. For example, the speed information may include the information on one of the two speed levels of the user input device 703. For example, the speed information may include the information on one of the three speed levels of the user input device 703. For example, the speed the information may include information on one of the four speed levels of the user input device 703. For example, the speed level of the user input device 703 may correspond to the first speed level in the case that the speed is smaller than the first threshold value, the second speed level in the case that the speed is greater than or equal to the first threshold value and is smaller than the second threshold value, the third speed level in the case that the speed is greater than or equal to the second threshold value and is smaller than the third threshold value, and the fourth speed level in the case that the speed is greater than or equal to the third threshold value. According to embodiments, the speed information may include the designated speed information type. According to an embodiment, the speed information may include the information on the movement speed and the acceleration of the user input device 703. According to an embodiment, the speed information may include the information on the rotation speed of the user input device 703. According to an embodiment, the speed information may include the information on whether the speed of the user input device 703 exceeds the threshold value. For example, the speed information may include the information on whether the speed of the user input device 703 exceeds approximately 0.3 m/s.

In an operation 721, the user input device 703 may adjust brightness of light emitted from a light source of the user input device 703 to improve a tracking performance for the user input device 703. According to embodiments, the brightness of the light emitted from the user input device 703 may be increased based on the speed information. According to an embodiment, in the case that the speed information is greater than or equal to the threshold value, the user input device 703 may increase the brightness of the light emitted from the user input device 703. Based on the speed information greater than or equal to the threshold value, as the length of the frame is set shorter than the previous length, the exposure value received during the frame length may decrease. As the exposure value decreases, the user input device 703 may increase the brightness of the light emitted from the user input device 703 to improve the tracking performance of the electronic device 701 for providing the virtual image. According to an embodiment, in the case that the speed information is smaller than the threshold value, the user input device 703 may lower the brightness of the light emitted from the user input device 703. Based on the speed information smaller than the threshold value, as the length of the frame is set to be longer than the previous length, the exposure value received from the camera of the electronic device 701 for providing the virtual image during the frame length may increase. As the exposure value increases, the user input device 703 may lower the brightness of the light emitted from the user input device 703 for power efficiency.

According to an embodiment, an operation in which the electronic device 701 for providing the virtual image, performed in the operation 719, transmits the control signal for adjusting the brightness of the light emitted from the user input device 703 may be omitted. For example, the user input device 703 may adjust the brightness of the light emitted from the user input device 703 based on the speed information obtained in the operation 713, even without receiving the control signal from the electronic device 701 for providing the virtual image.

In an operation 723, the electronic device 701 for providing the virtual image may obtain images of the user input device 703 based on the second camera setting. The second camera setting may include the second frame length. The second camera setting may include the second exposure value. The electronic device 701 for providing the virtual image may track the movement of the user input device 703 based on the images of the user input device 703. The electronic device 701 for providing the virtual image may track the movement of the user input device 703 based on a portion of an image corresponding to one or more light sources included in the user input device 703 in the obtained images.

In FIG. 7, the electronic device 701 for providing the virtual image is illustrated as performing the operation 711, the operation 717, and the operation 723, but the embodiment of the present disclosure is not limited thereto. The operation 711, the operation 717, and the operation 723 may be performed by a terminal coupled to an electronic device (e.g., the electronic device 101 of FIG. 1) for providing the virtual image.

Figure 8:
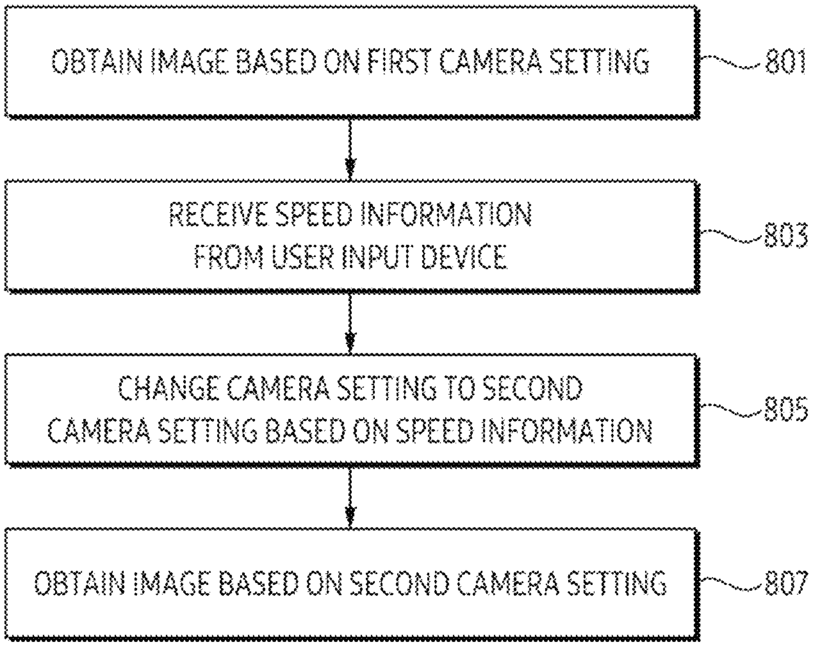
FIG. 8 illustrates an operation flow of changing a camera setting based on speed information of a controller, according to an embodiment.

FIG. 8 illustrates an operation flow in which an electronic device changes a camera setting based on speed information of a user input device, according to an embodiment.

Referring to FIG. 8, in an operation 801, an electronic device (e.g., the electronic device 201 for providing the virtual image of FIG. 2A) may obtain an image through a camera (e.g., the camera module 180 of FIG. 1) based on a first camera setting. The first camera setting may include a first frame length setting. The first camera setting may include a first exposure value setting. For example, an electronic device 201 for providing a virtual image may be a HMD. For example, the electronic device 201 for providing the virtual image may be an AR glasses.

In an operation 803, the electronic device 201 for providing the virtual image may receive speed information from a user input device. The user input device (e.g., the user input device 401 of FIG. 4A) may be a controller. The user input device (e.g., the user input device 401 of FIG. 4A) may transmit the speed information of the user input device 401 to the electronic device 201. According to an embodiment, the electronic device 201 for providing the virtual image may receive the speed information of the user input device 401 from the user input device 401 through a Bluetooth communication method. The electronic device 201 for providing the virtual image may receive the speed information of the user input device 401 from the user input device 401 through a Wi-Fi communication method. The electronic device 201 for providing the virtual image may receive the speed information of the user input device 401 from the user input device 401 through an UWB communication method. The electronic device 201 for providing the virtual image may receive the speed information of the user input device 401 from the user input device 401 through a cellular communication method. According to embodiments, the electronic device 201 for providing the virtual image may receive the speed information of the user input device 401 from the user input device 401 at a designated time point. According to an embodiment, the electronic device 201 for providing the virtual image may receive the speed information of the user input device 401 every designated period from the user input device 401. For example, the electronic device 201 for providing the virtual image may receive the speed information of the user input device 401 from the user input device 401 once every approximately 2 milliseconds (ms). According to an embodiment, the speed information may include information on a speed level of the user input device 401. According to an embodiment, the speed information of the user input device 401 may be divided into a plurality of sections. The one section may correspond to one speed level. According to an embodiment, the speed information may include information on one of a plurality of speed levels of the user input device 401. For example, the speed information may include information on one of two speed levels of the user input device 401. For example, the speed information may include information on one of three speed levels of the user input device 401. For example, the speed information may include information on one of four speed levels of the user input device 401. For example, the speed level of the user input device 401 may correspond to a first speed level in a case that the speed is smaller than a first threshold value, a second speed level in a case that the speed is greater than or equal to the first threshold value and is smaller than a second threshold value, a third speed level in a case that the speed is greater than or equal to the second threshold value and is smaller than a third threshold value, and a fourth speed level in a case that the speed is greater than or equal to the third threshold value. According to embodiments, the speed information may include a designated speed information type. According to an embodiment, the speed information may include information on a speed value of the user input device 401. According to embodiments, the speed information may include the designated speed information type. According to an embodiment, the speed information may include information on a movement speed and acceleration of the user input device 401. According to an embodiment, the speed information may include information on a rotation speed of the user input device 401. According to an embodiment, the speed information may include information on whether a speed of the user input device 401 exceeds a threshold value. For example, the speed information may include information on whether the speed of the user input device 401 exceeds approximately 0.3 m/s.

In an operation 805, the electronic device 201 for providing the virtual image may change a camera setting to a second camera setting based on the speed information. A first camera setting may include a first frame length. The second camera setting may include a second frame length. The first camera setting may include a first exposure value received during the first frame length. The second camera setting may include a second exposure value received during the second frame length. In a case that the speed information is greater than or equal to the threshold value, the second frame may be shorter than the first frame. In the case that the speed information is greater than or equal to the threshold value, the second exposure value received during the second frame length may be smaller than the first exposure value received during the first frame length. In a case that the speed information is smaller than the threshold value, the second frame length may be longer than the first frame length. In the case that the speed information is smaller than the threshold value, the second exposure value received during the second frame length may be greater than the first exposure value received during the first frame length. According to embodiments, the electronic device 201 for providing the virtual image may change a camera setting from the first camera setting to the second camera setting based on the speed information of the user input device 401. According to an embodiment, the electronic device 201 for providing the virtual image may change the camera setting from the first camera setting to the second camera setting based on identifying that the speed information of the user input device 401 is greater than or equal to the threshold value. For example, the electronic device 201 for providing the virtual image may change the camera setting from the first camera setting to the second camera setting only in a case that the speed of the user input device 401 is approximately 0.3 m/s or more. According to an embodiment, the electronic device 201 for providing the virtual image may not change the camera setting from the first camera setting to the second camera setting based on identifying that the speed information of the user input device 401 is smaller than the threshold value. For example, the electronic device 201 for providing the virtual image may not change the camera setting from the first camera setting to the second camera setting based on the speed of the user input device 401 smaller than approximately 0.3 m/s. According to embodiments, the electronic device 201 for providing the virtual image may change the camera setting from the first camera setting to the second camera setting within a designated time. According to an embodiment, the electronic device 201 for providing the virtual image may gradually change the camera setting from the first camera setting to the second camera setting over the designated time. For example, the electronic device 201 for providing the virtual image may change the camera setting from the first camera setting to the second camera setting over 3 seconds. For example, the electronic device 201 for providing the virtual image may change a length of a frame from the first frame length to the second frame length over 3 seconds. For example, the electronic device 201 for providing the virtual image may change an exposure value from the first exposure value to the second exposure value over 3 seconds. According to an embodiment, the electronic device 201 for providing the virtual image may change the camera setting from the first camera setting to the second camera setting within the designated time. For example, the electronic device 201 for providing the virtual image may change the camera setting from the first camera setting to the second camera setting within 1 second. For example, the electronic device 201 for providing the virtual image may change the length of the frame from the first frame length to the second frame length within 1 second. For example, the electronic device 201 for providing the virtual image may change the exposure value from the first exposure value to the second exposure value within 1 second.

According to embodiments, the electronic device 201 for providing the virtual image may transmit a control signal for adjusting brightness of light emitted from the user input device 401 to the user input device 401 through a designated communication method.

In an operation 807, the electronic device 201 for providing the virtual image may obtain an image through the camera (e.g., the camera module 180 of FIG. 1) based on the second camera setting. The second camera setting may include the second frame length. The second camera setting may include the exposure value. The electronic device 201 for providing the virtual image may track a movement of the user input device 401 based on the images of the user input device 401. The electronic device 201 for providing the virtual image may track the movement of the user input device 401 based on a portion of an image corresponding to one or more light sources included in the user input device 401 in the obtained images.

Figure 9:
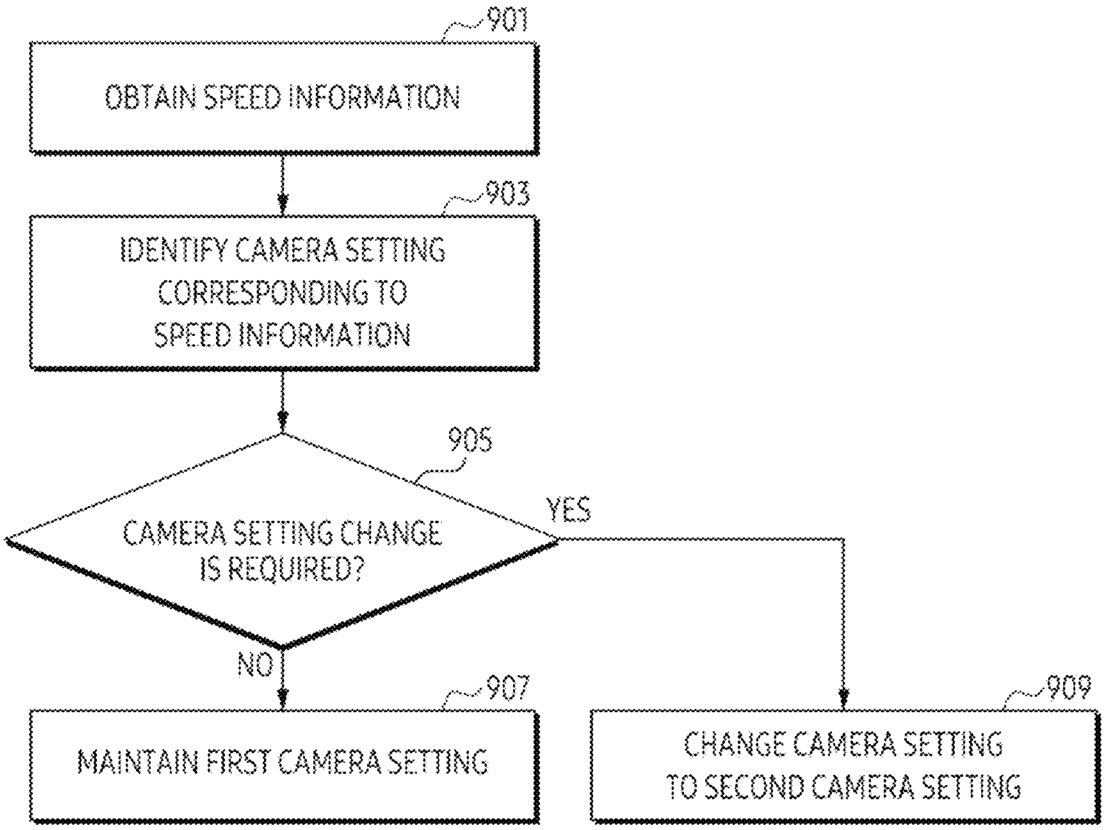
FIG. 9 illustrates an operation flow of manipulating a camera setting by identifying whether the camera setting is changed based on speed information of a controller, according to an embodiment.

FIG. 9 illustrates an operation flow in which an electronic device manipulates a camera setting by identifying whether the camera setting is changed based on speed information of a user input device, according to an embodiment.

Referring to FIG. 9, in an operation 901, an electronic device (e.g., the electronic device 201 for providing the virtual image of FIG. 2A) may obtain speed information. An electronic device 201 for providing the virtual image may be a HMD. The speed information may movement speed information of a user input device (e.g., the user input device 401 of FIG. 4A). A user input device 401 may be a controller. According to embodiments, the electronic device 201 for providing the virtual image may obtain the speed information of the user input device 401 through a designated communication method from the user input device 401. According to an embodiment, the electronic device 201 for providing the virtual image may obtain the speed information of the user input device 401 from the user input device 401 through a Bluetooth communication method. The electronic device 201 for providing the virtual image may obtain the speed information of the user input device 401 from the user input device 401 through a Wi-Fi communication method. The electronic device 201 for providing the virtual image may obtain the speed information of the user input device 401 from the user input device 401 through an UWB communication method. The electronic device 201 for providing the virtual image may obtain the speed information of the user input device 401 from the user input device 401 through a cellular communication method. According to embodiments, the electronic device 201 for providing the virtual image may obtain the speed information of the user input device 401 at a designated time point from the user input device 401. According to an embodiment, the electronic device 201 for providing the virtual image may obtain the speed information of the user input device 401 every designated period from the user input device 401. For example, the electronic device 201 for providing the virtual image may obtain the speed information of the user input device 401 from the user input device 401 once every approximately 2 milliseconds (ms). According to an embodiment, the electronic device 201 for providing the virtual image may obtain the speed information of the user input device 401 from the user input device 401 based on the speed information of the user input device 401. According to an embodiment, the electronic device 201 for providing the virtual image may obtain the speed information of the user input device 401 from the user input device 401 based on identifying that the speed information of the user input device 401 is greater than or equal to a threshold value. For example, the electronic device 201 for providing the virtual image may obtain the speed information of the user input device 401 from the user input device 401 only in a case that speed of the user input device 401 is approximately 0.3 m/s or more. According to an embodiment, the electronic device 201 for providing the virtual image may not obtain the speed information of the user input device 401 from the user input device 401 based on identifying that the speed information of the user input device 401 is smaller than the threshold value. For example, the electronic device 201 for providing the virtual image may not obtain the speed information of the user input device 401 from the user input device 401 based on the speed of the user input device 401 less than approximately 0.3 m/s. According to embodiments, the speed information may include information on a speed level of the user input device 401. According to an embodiment, the speed information may include information on the speed level of the user input device 401. According to an embodiment, the speed information of the user input device 401 may be divided into a plurality of sections. The one section may correspond to one speed level. According to an embodiment, the speed information may include information on one of a plurality of speed levels of the user input device 401. For example, the speed information may include information on one of two speed levels of the user input device 401. For example, the speed information may include information on one of three speed levels of the user input device 401. For example, the speed information may include information on one of four speed levels of the user input device 401. For example, the speed level of the user input device 401 may correspond to the first speed level in a case that the speed is smaller than a first threshold value, a second speed level in a case that the speed is greater than or equal to the first threshold value and is smaller than a second threshold value, the third speed level in a case that the speed is greater than or equal to the second threshold value and is smaller than the third threshold value, and the fourth speed level in a case that the speed is greater than or equal to the third threshold value. According to embodiments, the speed information may include the designated speed information type. According to an embodiment, the speed information may include information on a speed value of the user input device 401. According to an embodiment, the speed information may include information on a movement speed and acceleration of the user input device 401. According to an embodiment, the speed information may include information on a rotation speed of the user input device 401. According to an embodiment, the speed information may include information on whether the speed of the user input device 401 exceeds the threshold value. For example, the speed information may include information on whether the speed of the user input device 703 exceeds approximately 0.3 m/s.

In an operation 903, the electronic device 201 for providing the virtual image may identify a camera setting corresponding to the received speed information of the user input device 401. The camera setting may include a frame length. The camera setting may include an exposure value. In a case that the received speed information of the user input device 401 is greater than or equal to the threshold value, the camera setting may include a shorter frame length and a shorter exposure value. In a case that the received speed information of the user input device 401 is smaller than the threshold value, the camera setting may include a longer frame length and a longer exposure value. In the case that the speed information is greater than or equal to the threshold value, a second frame length may be shorter than a first frame length. In the case that the speed information is greater than or equal to the threshold value, a second exposure value received during the second frame length may be smaller than a first exposure value received during the first frame length. In the case that the speed information is smaller than the threshold value, the second frame length may be longer than the first frame length. In the case that the speed information is greater than or equal to the threshold value, the second exposure value received during the second frame length may be greater than the first exposure value received during the first frame length.

According to embodiments, in a case that the speed of the user input device 401 is fast, a blur phenomenon may occur in an image obtained from a camera (e.g., the second camera unit 223 of FIG. 2A). In a case that the blur phenomenon occurs in the image obtained from the camera 223, tracking of the user input device 401 may be difficult. According to an embodiment, in order to prevent the blur phenomenon, in the case that the speed of the user input device 401 is greater than or equal to the threshold value, the electronic device 201 (e.g., the HMD for providing the virtual image may reduce a frame length of the camera 223 of the electronic device 201. In a case that a length of a frame is shortened, the blur phenomenon may be reduced. Therefore, in the case that the speed of the user input device 401 is fast, the electronic device 201 for providing the virtual image may set the camera to the second frame length shorter than the first frame length.

According to embodiments, in the case that the length of the frame is shortened, the exposure value of the camera 223 may be reduced. In the case that the speed information is greater than or equal to the threshold value, as the length of the frame is set to be shorter than the previous length, the exposure value received during the length of the frame may decrease. Therefore, the electronic device 201 for providing the virtual image may set the camera to the second exposure value smaller than the first exposure value in the case that the user input device 401 is fast.

In an operation 905, the electronic device 201 for providing the virtual image may identify whether a camera setting change is required. The electronic device 201 for providing the virtual image may perform an operation 909, in a case that the camera setting change is required. The electronic device 201 for providing the virtual image may perform an operation 907, in a case that the camera setting change is not required.

In the operation 907, the electronic device 201 for providing the virtual image may maintain a first camera setting.

In the case that the received speed information of the user input device 401 is smaller than the threshold value, the electronic device 201 for providing the virtual image may maintain the first camera setting.

In the operation 909, the electronic device 201 for providing the virtual image may change the camera setting to the second camera setting. In the case that the received speed information of the user input device 401 is greater than or equal to the threshold value, the electronic device 201 for providing the virtual image may change the camera setting from the first camera setting to the second camera setting. As the length of the frame is set to be shorter than the previous length based on the speed information greater than or equal to the threshold value, the exposure value received during the length of the frame may decrease. According to an embodiment, the electronic device 201 for providing the virtual image may gradually change the camera setting from the first camera setting to the second camera setting over the designated time. For example, the electronic device 201 for providing the virtual image may change the camera setting from the first camera setting to the second camera setting over 3 seconds. The electronic device 201 for providing the virtual image may change the length of the frame from the first frame length to the second frame length over 3 seconds. The electronic device 201 for providing the virtual image may change the exposure value from the first exposure value to the second exposure value over 3 seconds. According to an embodiment, the electronic device 201 for providing the virtual image may change the camera setting from the first camera setting to the second camera setting within the designated time. For example, the electronic device 201 for providing the virtual image may change the camera setting from the first camera setting to the second camera setting within the designated time (e.g., 1 second). The electronic device 201 for providing the virtual image may change the length of the frame from the first frame length to the second frame length within the designated time (e.g., 1 second). The electronic device 201 for providing the virtual image may change the exposure value from the first exposure value to the second exposure value within the designated time (e.g., 1 second).

Figure 10:
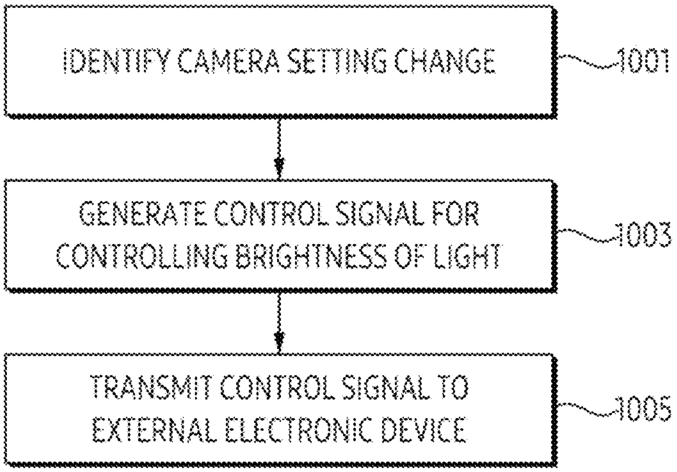
FIG. 10 illustrates an operation flow for controlling brightness of a light source of a controller based on a control signal, according to an embodiment.

FIG. 10 illustrates an operation flow of controlling brightness of a light source of a user input device based on a control signal, according to an embodiment.

Referring to FIG. 10, in an operation 1001, an electronic device (e.g., the electronic device 201 for providing the virtual image of FIG. 2A) for providing a virtual image may identify a camera setting change. The electronic device 201 for providing the virtual image may change the camera setting based on received speed information.

According to an embodiment, the speed information may include information on a speed level of a user input device 401. According to an embodiment, the speed information of the user input device 401 may be divided into a plurality of sections. The one section may correspond to one speed level. According to an embodiment, the speed information may include information on one of a plurality of speed levels of the user input device 401. For example, the speed information may include information on one of two speed levels of the user input device 401. For example, the speed information may include information on one of three speed levels of the user input device 401. For example, the speed information may include information on one of four speed levels of the user input device 401. For example, the speed information may include information on the speed level of the user input device 401. The speed level of the user input device 401 may correspond to a first speed level in a case that the speed is smaller than a first threshold value, a second speed level in a case that the speed is greater than or equal to the first threshold value and is smaller than a second threshold value, the third speed level in a case that the speed is greater than or equal to the second threshold value and is smaller than the third threshold value, and the fourth speed level in a case that the speed is greater than or equal to the third threshold value. According to embodiments, the speed information may include a designated speed information type. According to an embodiment, the speed information may include information on a speed value of the user input device 401. According to an embodiment, the speed information may include information on a movement speed and acceleration of the user input device 401. According to an embodiment, the speed information may include information on a rotation speed of the user input device 401. According to an embodiment, the speed information may include the information on whether the speed of the user input device 401 exceeds the threshold value. For example, the speed information may include information on whether the speed of the user input device 703 exceeds approximately 0.3 m/s.

In an operation 1003, the electronic device 201 for providing the virtual image may generate a control signal for controlling brightness of light. The electronic device 201 for providing the virtual image may generate the control signal for controlling the brightness of light emitted by a light source (e.g., the light source 409 of FIG. 4A) included in the user input device (e.g., the user input device 401 of FIG. 4A).

In an operation 1005, the electronic device 201 for providing the virtual image may transmit the control signal to the user input device 401. The electronic device 201 for providing the virtual image may transmit the control signal to the user input device 401. According to embodiments, the electronic device 201 for providing the virtual image may transmit the control signal for adjusting the brightness of the light emitted from the user input device 401 to the user input device 401 through a designated communication method. According to an embodiment, the electronic device 201 for providing the virtual image may transmit the control signal for adjusting the brightness of the light emitted from the user input device 401 to the user input device 401 through a Bluetooth communication method. The electronic device 201 for providing the virtual image may transmit the control signal for adjusting the brightness of the light emitted from the user input device 401 to the user input device 401 through a Wi-Fi communication method. The electronic device 201 for providing the virtual image may transmit the control signal for adjusting the brightness of the light emitted from the user input device 401 through an UWB communication method to the user input device 401. The electronic device 201 for providing the virtual image may transmit the control signal for adjusting the brightness of the light emitted from the user input device 401 to the user input device 401 through a cellular communication method.

According to embodiments, the electronic device 201 for providing the virtual image may transmit the control signal for adjusting the brightness of the light emitted from the user input device 401 at a designated time point to the user input device 401. According to an embodiment, the electronic device 201 for providing the virtual image may transmit the control signal for adjusting the brightness of light emitted from the user input device 401 to the user input device 401 every designated period. For example, the electronic device 201 for providing the virtual image may transmit the control signal for adjusting the brightness of light emitted from the user input device 401 to the user input device 401 once every 2 milliseconds (ms). According to embodiments, the electronic device 201 for providing the virtual image may transmit the control signal for adjusting the brightness of the light emitted from the user input device 401 to the user input device 401 based on the speed information of the user input device 401.

According to an embodiment, the electronic device 201 for providing the virtual image may transmit the control signal for adjusting the brightness of the light emitted from the user input device 401 to the user input device 401 based on identifying that the speed information of the user input device 401 is greater than or equal to the threshold value. For example, the electronic device 201 for providing the virtual image may transmit the control signal for adjusting the brightness of the light emitted from the user input device 401 to the user input device 401 only in a case that the speed of the user input device 401 is approximately 0.3 m/s or more.

According to an embodiment, the electronic device 201 for providing the virtual image may not transmit the control signal for adjusting the brightness of the light emitted from the user input device 401 to the user input device 401 based on identifying that the speed information of the user input device 401 is smaller than the threshold value. For example, the electronic device 201 for providing the virtual image may not transmit the control signal for adjusting the brightness of the light emitted from the user input device 401 to the user input device 401 based on the speed of the user input device 401 smaller than approximately 0.3 m/s.

As described above, according to an embodiment, an electronic device 101, 201, or 241 may comprise at least one processor, at least one camera (221 or 251), and at least one communication circuitry to communicate with an external electronic device 103, 401, or 411. The at least one processor may obtain an image for the external electronic device 103, 401, or 411 based on a first camera setting. The at least one processor may receive, from the external electronic device 103, 401, or 411, speed information of the external electronic device 103, 401, or 411. The at least one processor may change a camera setting from the first camera setting to a second camera setting based on the received speed information. The at least one processor may obtain images of the external electronic device 103, 401, or 411 based on the changed second camera setting. The first camera setting may include a first frame length. The second camera setting may include a second frame length. In a case that the speed information is greater than or equal to a threshold value, the second frame length may be shorter than the first frame length. In a case that the speed information is smaller than the threshold value, the second frame length may be longer than the first frame length.

According to an embodiment, in the case that the speed information is greater than or equal to the threshold value, a second exposure value received during the second frame length may be smaller than a first exposure value received during the first frame length. In the case that the speed information is smaller than the threshold value, the second exposure value received during the second frame length may be greater than the first exposure value received during the first frame length.

According to an embodiment, the at least one processor may, in the case that the speed information is greater than or equal to a reference value, further generate a control signal for increasing brightness of light emitted from the external electronic device 103, 401, or 411. The at least one processor may further transmit the control signal to the external electronic device 103, 401, or 411.

According to an embodiment, the electronic device 101, 201, or 241 may comprise a display. The electronic device may comprise an optical waveguide for changing a path of light generated by the display. The electronic device 101, 201, or 241 may comprise the at least one camera. The electronic device may comprise a transparent member 235, or 237 through which the light generated by the display 203, or 243 is transmitted. The electronic device 101, 201, or 241 may be a HMD device 241.

According to an embodiment, the at least one processor may further identify a portion of an image corresponding to an object for tracking within the external electronic device from each of the images obtained based on the second camera setting. The at least one processor may further perform a designated function based on a tracking result of the portion of the image corresponding to the object.

According to an embodiment, the designated function may be recognition of a movement of a user.

According to an embodiment, the light emitted from the external electronic device 103, 401, or 411 may have a wavelength in an infrared band.

As described above, a method performed by an electronic device 101, 201, or 241 may comprise obtaining an image for an external electronic device 103, 401, or 411 based on a first camera setting. The method may comprise receiving, from the external electronic device 103, 401, or 411, speed information of the external electronic device 103, 401, or 411. The method may comprise changing a camera setting from the first camera setting to a second camera setting based on the received speed information. The method may comprise obtaining images of the external electronic device 103, 401, or 411 based on the changed second camera setting. The first camera setting may include a first frame length. The second camera setting may include a second frame length. In a case that the speed information is greater than or equal to a threshold value, the second frame length may be shorter than the first frame length. In a case that the speed information is smaller than the threshold value, the second frame length may be longer than the first frame length.

According to an embodiment, in the case that the speed information is greater than or equal to the threshold value, a second exposure value received during the second frame length may be smaller than a first exposure value received during the first frame length. In the case that the speed information is smaller than the threshold value, the second exposure value received during the second frame length may be greater than the first exposure value received during the first frame length.

According to an embodiment, the method may further comprise, in the case that the speed information is greater than or equal to a reference value, generating a control signal for increasing brightness of light emitted from the external electronic device 103, 401, or 411. The method may further comprise transmitting the control signal to the external electronic device 103, 401, or 411.

According to an embodiment, the electronic device 101, or 241 may be a HMD device 241 including a display 243, an optical waveguide for changing a path of light generated by the display, at least one camera 251, and a transparent member through which light generated by the display is transmitted.

According to an embodiment, the method may further comprise identifying a portion of an image corresponding to an object for tracking within the external electronic device 103, 401, or 411 from each of the images obtained based on the second camera setting. The method may further comprise performing a designated function based on a tracking result of the portion of the image corresponding to the object.

According to an embodiment, the designated function may be recognition of a movement of a user.

According to an embodiment, the light emitted from the external electronic device 103, 401, or 411 may have a wavelength in an infrared band.

As described above, according to an embodiment, an electronic device 103, 401, or 411 may be configured to comprise at least one processor, an IMU sensor, one or more light sources 409, or 421, at least one communication circuitry to communicate with an external electronic device 101, 201, or 241. The at least one processor may obtain speed information of the electronic device 103, 401, or 411 through the IMU sensor. The at least one processor may generate a signal for informing the speed information of the electronic device 103, 401, or 411 measured by the IMU sensor. The at least one processor may be configured to transmit the signal to the external electronic device 101, 201, or 241.

According to an embodiment, in order to obtain the speed information of the electronic device 103, 401, or 411, the IMU sensor may measure acceleration information. The IMU sensor may obtain the speed information of the electronic device 103, 401, or 411 by adding up the acceleration information that are accumulated.

According to an embodiment, the electronic device 103, 401, or 411 may comprise a handle 413 and a sensor 415, 417, or 419 for receiving an input of a user. The electronic device 103, 401, or 411 may be a controller 401, or 411 for receiving the input of the user and tracking a movement of the user.

According to an embodiment, the at least one processor may, in a case that the speed information of the electronic device 103, 401, or 411 measured by the IMU sensor is greater than or equal to a reference value, increase brightness of light emitted from the one or more light sources 409, or 421.

According to an embodiment, the at least one processor may receive a control signal from the external electronic device 101, 201, 241. The at least one processor may adjust the brightness of light emitted from the one or more light sources 409, or 421 based on the received control signal.

According to an embodiment, the light emitted from the one or more light sources 409, or 421 may be in an infrared wavelength band.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," or "connected with" another element (e.g., a second element), it means that the element may be coupled with the other element directly (e.g., via a wire), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one processor;

at least one camera;

at least one communication circuitry configured to communicate with an external electronic device; and memory storing instructions that, when executed by the at least one processor individually or collectively, cause the electronic device to:

obtain a first image for tracking the external electronic device through the at least one camera, based on a first camera setting;

receive, from the external electronic device through the at least one communication circuitry, speed information related to a speed of the external electronic device;

change the first camera setting to a second camera setting, based on the received speed information related to the speed of the external electronic device; and obtain a second image for tracking the external electronic device through the at least one camera, based on the second camera setting;

wherein the first camera setting comprises a first frame length, wherein the second camera setting comprises a second frame length, wherein, in a first case that the speed is greater than or equal to a threshold value, the second frame length is shorter than the first frame length, and wherein, in a second case that the speed is smaller than the threshold value, the second frame length is longer than the first frame length.

2. The electronic device of claim 1, wherein, in the first case that the speed is greater than or equal to the threshold value, a second exposure value received during the second frame length is smaller than a first exposure value received during the first frame length, and wherein, in the second case that the speed is smaller than the threshold value, the second exposure value received during the second frame length is greater than the first exposure value received during the first frame length.

3. The electronic device of claim 1, wherein the instructions, when executed by the at least one processor individually or collectively, cause the electronic device to:

in a third case that the speed is greater than or equal to a reference value, generate a control signal for increasing brightness of light emitted from the external electronic device, and transmit the control signal to the external electronic device through the at least one communication circuitry.

4. The electronic device of claim 1, wherein the electronic device is a head-mounted display (HMD) device comprising:

a display;

an optical waveguide for changing a path of light generated by the display; and a transparent member, and wherein the light generated by the display is transmitted through the transparent member.

5. The electronic device of claim 1, wherein the instructions, when executed by the at least one processor individually or collectively, cause the electronic device to:

identify, from the second image obtained based on the second camera setting, a portion corresponding to an object for tracking within the external electronic device, and perform a designated function based on a tracking result of the portion corresponding to the object.

6. The electronic device of claim 5, wherein the designated function is recognition of a movement of a user.

7. The electronic device of claim 6, wherein the light emitted from the external electronic device has a wavelength in an infrared band.

8. The electronic device of claim 1, wherein the speed information includes information for indicating a speed level corresponding to the speed of the external electronic device among a plurality of speed levels.

9. The electronic device of claim 1, wherein the speed information includes information on whether the speed of the external electronic device exceeds the threshold value or not.

10. The electronic device of claim 1, wherein the speed information includes a value indicating the speed of the external electronic device.

11. The electronic device of claim 1, wherein the speed of the external electronic device comprises at least one of a movement speed or a rotation speed.

12. The electronic device of claim 1, wherein the electronic device corresponds to a head-mounted display (HMD) device, and wherein the external electronic device corresponds to a controller associated with the HMD device and configured to provide a user input to the HMD device.

13. A method performed by an electronic device, the method comprising:

obtaining a first image for tracking an external electronic device based on a first camera setting;

receiving, from the external electronic device, speed information related to a speed of the external electronic device;

changing the first camera setting to a second camera setting based on the received speed information related to the speed of the external electronic device; and obtaining at least a second image for tracking the external electronic device based on the second camera setting, wherein the first camera setting comprises a first frame length, wherein the second camera setting comprises a second frame length, wherein, in a first case that the speed is greater than or equal to a threshold value, the second frame length is shorter than the first frame length, and wherein, in a second case that the speed is smaller than the threshold value, the second frame length is longer than the first frame length.

14. The method of claim 13, wherein, in the first case that the speed is greater than or equal to the threshold value, a second exposure value received during the second frame length is smaller than a first exposure value received during the first frame length, and wherein, in the second case that the speed is smaller than the threshold value, the second exposure value received during the second frame length is greater than the first exposure value received during the first frame length.

15. The method of claim 13, further comprising:

in a third case that the speed is greater than or equal to a reference value, generating a control signal for increasing brightness of light emitted from the external electronic device, and transmitting the control signal to the external electronic device.

16. The method of claim 13, wherein the electronic device comprises a head-mounted display (HMD) device comprising:

a display;

an optical waveguide for changing a path of light generated by the display;

at least one camera; and a transparent member, and wherein light generated by the display is transmitted through the transparent member.

17. An electronic device comprising:

an inertial measurement unit (IMU) sensor;

at least one light source;

at least one communication circuitry configured to communicate with an external electronic device; and at least one processor operatively connected to the IMU sensor, the at least one light source, and the at least one communication circuitry, memory storing instructions that, when executed by the at least one processor individually or collectively, cause the electronic device to:

obtain speed information related to a speed of the electronic device through the IMU sensor;

generate a signal for informing the speed information related to the speed of the electronic device measured by the IMU sensor; and transmit the signal to the external electronic device through the at least one communication circuitry, wherein the speed information is used to adjust a camera setting for tracking the electronic device in the external electronic device.

18. The electronic device of claim 17, wherein the IMU sensor is configured to:

measure acceleration information; and obtain the speed information related to the speed of the electronic device by adding up the acceleration information that are accumulated.

19. The electronic device of claim 17, wherein the instructions, when executed by the at least one processor individually or collectively, cause the electronic device to:

in a case that the speed information related to the speed of the electronic device measured by the IMU sensor is greater than or equal to a reference value, increase brightness of light emitted from the at least one light source.

20. The electronic device of claim 19, wherein the instructions, when executed by the at least one processor individually or collectively, cause the electronic device to:

receive a control signal from the external electronic device through the at least one communication circuitry; and adjust the brightness of light emitted from the at least one light source based on the received control signal.

* * * * *